US012600811B2

(12) United States Patent
Tsukamoto et al.

(10) Patent No.: US 12,600,811 B2
(45) Date of Patent: Apr. 14, 2026

(54) CROSSLINKING AGENT COMPOSITION FOR WATER-COMPATIBLE RESIN, AND WATER-COMPATIBLE RESIN COMPOSITION

(71) Applicant: NISSHINBO CHEMICAL INC., Tokyo (JP)

(72) Inventors: Nami Tsukamoto, Chiba (JP); Nana Takahashi, Chiba (JP)

(73) Assignee: NISSHINBO CHEMICAL INC., Tokyo (JP)

( * ) Notice: Subject to any disclaimer, the term of this patent is extended or adjusted under 35 U.S.C. 154(b) by 719 days.

(21) Appl. No.: 17/788,458

(22) PCT Filed: Dec. 24, 2020

(86) PCT No.: PCT/JP2020/048481
§ 371 (c)(1),
(2) Date: Jun. 23, 2022

(87) PCT Pub. No.: WO2021/132474
PCT Pub. Date: Jul. 1, 2021

(65) Prior Publication Data
US 2023/0040953 A1      Feb. 9, 2023

(30) Foreign Application Priority Data

Dec. 25, 2019    (JP) ................................. 2019-234592

(51) Int. Cl.
| | |
|---|---|
| *C08J 5/18* | (2006.01) |
| *C08G 18/02* | (2006.01) |
| *C08G 18/16* | (2006.01) |
| *C08K 5/00* | (2006.01) |
| *C08L 75/00* | (2006.01) |

(52) U.S. Cl.
CPC ......... C08G 18/025 (2013.01); C08G 18/168 (2013.01); C08J 5/18 (2013.01); C08K 5/0025 (2013.01); *C08G 2150/00* (2013.01); *C08G 2170/80* (2013.01)

(58) Field of Classification Search
CPC ........ C08G 18/025; C08G 18/168; C08J 5/18; C08L 75/00
See application file for complete search history.

(56) References Cited

U.S. PATENT DOCUMENTS

| | | | |
|---|---|---|---|
| 4,487,964 A | 12/1984 | Watson, Jr. et al. | |
| 2006/0194939 A1* | 8/2006 | Licht ................... | C08G 18/025 |
| | | | 528/61 |
| 2006/0217483 A1* | 9/2006 | Tennebroek ........... | C08G 18/68 |
| | | | 524/501 |
| 2018/0371237 A1 | 12/2018 | Tsukamoto et al. | |
| 2022/0145122 A1 | 5/2022 | Tsukamoto | |

FOREIGN PATENT DOCUMENTS

| | | | |
|---|---|---|---|
| JP | S59-193916 A | | 11/1984 |
| JP | H09-249801 A | | 9/1997 |
| JP | 2000-319351 A | | 11/2000 |
| JP | 2004277569 A | * | 10/2004 |
| JP | 2013-112755 A | | 6/2013 |
| WO | 2017/006950 A1 | | 1/2017 |
| WO | 2020/179836 A1 | | 9/2020 |

OTHER PUBLICATIONS

Jp-2004277569-A_Oct. 7, 2004_English Translation.*
Extended (Supplementary) European Search Report dated Feb. 26, 2024, issued in counterpart Applicaiton No. 20905088.9. (9 pages).
International Search Report dated Mar. 16, 2021, issued in counterpart Application No. PCT/JP2020/048481. (2 pages).

* cited by examiner

*Primary Examiner* — Michael L Leonard
(74) *Attorney, Agent, or Firm* — WHDA, LLP

(57) ABSTRACT

A crosslinking agent composition for water-compatible resins which comprises a hydrophobic crosslinking agent, a water-soluble organic compound, one or more oily media selected from among hydrocarbon-based solvents and ketone-based solvents having a solubility parameter of 9.0 $(cal/cm^{-3})^{1/2}$ or less, and an aqueous medium. The crosslinking agent composition can improve the storage stability of a water-compatible resin composition. The water-compatible resin composition which contains this crosslinking agent composition can give cured objects satisfactory in terms of water resistance and solvent resistance and is suitable also for use in wet-on-wet coating.

13 Claims, No Drawings

CROSSLINKING AGENT COMPOSITION FOR WATER-COMPATIBLE RESIN, AND WATER-COMPATIBLE RESIN COMPOSITION

TECHNICAL FIELD

This invention relates to a crosslinking agent composition for water-compatible resins, and to a water-compatible resin composition.

BACKGROUND ART

Water-compatible resins, because they can be prepared into compositions which use water as a solvent and are environmentally benign and very safe, are employed in a variety of applications, including textile finishes, adhesives and coatings.

Hydrophilic groups such as hydroxyl groups and carboxyl groups are introduced into these water-compatible resins so as to impart water solubility or water dispersibility to the resin itself. Hence, compared with oily resins, the resulting cured product tends to be inferior in terms of water resistance and durability.

A crosslinking agent such as a polycarbodiimide compound is generally included in a water-compatible resin composition for the purpose of enhancing such properties of the cured product as the water resistance, durability and strength.

In order for a crosslinking agent that has been included to effectively exhibit a crosslinking action in the water-compatible resin composition, it is desirable for the crosslinking agent itself to have a good dispersibility in water.

Known methods for dispersing polycarbodiimide compounds in water include a technique which uses a polycarbodiimide compound that has been end-capped with polyethylene glycol or the like and has hydrophilic groups on the ends (see Patent Document 1) and a technique which uses a sodium salt of a dialkyl sulfosuccinate to emulsify in water a solution of a polycarbodiimide compound dissolved in amyl acetate (see Patent Documents 2 and Example 11).

However, in the art of Patent Document 1, when the terminal hydrophilic group-containing polycarbodiimide compound is dispersed in a water-compatible resin-containing aqueous solution, carbodiimide groups are present at interfaces between the water and the water-compatible resin and readily react with the water, as a result of which the water-compatible resin composition lacks sufficient storage stability and has a shortened pot life.

The emulsified liquid of Patent Document 2 also lacks sufficient storage stability, leaving room for further improvement.

PRIOR ART DOCUMENTS

Patent Documents

Patent Document 1: WO 2017/006950
Patent Document 2: JP-A S59-193916

SUMMARY OF INVENTION

Technical Problem

The present invention was arrived at in light of the above circumstances. An object of the invention is to provide a crosslinking agent composition for water-compatible resins which can increase the storage stability of water-compatible resin compositions. Another object is to provide a water-compatible resin composition which includes this crosslinking agent composition, gives a cured product having good water resistance and good solvent resistance, and can be suitably used also in wet-on-wet coating.

Solution to Problem

The inventors have conducted intensive investigations in order to achieve the above objects. As a result, they have discovered that by using a crosslinking agent composition for water-compatible resins which includes a hydrophobic crosslinking agent, a water-soluble organic compound, a surfactant, a specific oily medium and an aqueous medium, a water-compatible resin composition can be obtained which has a good storage stability, which can be used also in wet-on-wet coating, and which gives a cured product having excellent water resistance and solvent resistance. This discovery ultimately led to the present invention.

Accordingly, the invention provides:

1. A crosslinking agent composition for water-compatible resins, which composition includes a hydrophobic crosslinking agent, a water-soluble organic compound, one or more oily medium selected from the group consisting of ketone solvents having a solubility parameter of 9.0 $(cal/cm^{-3})^{1/2}$ or less and hydrocarbon solvents, and an aqueous medium;

2. The crosslinking agent composition for water-compatible resins of 1 above, wherein the composition is in the form of an emulsion in which an oily phase containing the hydrophobic crosslinking agent and the oily medium is dispersed in the aqueous medium;

3. The crosslinking agent composition for water-compatible resins of 1 or 2 above, wherein the hydrophobic crosslinking agent includes one or more selected from the group consisting of carbodiimide compounds, isocyanate compounds, polyfunctional epoxy compounds, silane compounds, metallic compounds, oxazoline compounds and melamines;

4. The crosslinking agent composition for water-compatible resins of 3 above, wherein the hydrophobic crosslinking agent includes a carbodiimide compound;

5. The crosslinking agent composition for water-compatible resins of any of 1 to 4 above, wherein the hydrocarbon solvent is an isoparaffinic solvent or an aromatic hydrocarbon solvent;

6. The crosslinking agent composition for water-compatible resins of any of 1 to 4 above, wherein the ketone solvent is methyl isopropyl ketone, methyl butyl ketone, methyl propyl ketone, methyl hexyl ketone, 2-heptanone, 3-heptanone or 4-heptanone;

7. The crosslinking agent composition for water-compatible resins of any of 1 to 6 above, wherein the water-soluble organic compound is one or more selected from the group consisting of alkylene glycol compounds and water-soluble polymers other than alkylene glycol compounds;

8. The crosslinking agent composition for water-compatible resins of any of 1 to 6 above, wherein the water-soluble organic compound is one or more water-soluble polymer selected from the group consisting of polyvinylpyrrolidone, polyvinyl alcohol, polyethyleneimine, polyacrylic acid, polyacrylamide, carboxymethyl cellulose, starch and gelatin;

9. The crosslinking agent composition for water-compatible resins of any of 1 to 8 above which includes from 10 to 250 parts by weight of the oily medium per 100 parts by weight of the hydrophobic crosslinking agent;

10. The crosslinking agent composition for water-compatible resins of any of 1 to 9 above, wherein the aqueous medium includes at least 50 wt % of water;

11 The crosslinking agent composition for water-compatible resins of any of 1 to 10 above, further including a surfactant;

12 The crosslinking agent composition for water-compatible resins of 11 above, wherein the surfactant is an anionic surfactant;

13 The crosslinking agent composition for water-compatible resins of 11 above, wherein the surfactant is selected from the group consisting of alkylbenzene sulfones, alkyl sulfates and sodium N-cocoyl methyl taurate;

14. A method of preparing a crosslinking agent composition for water-compatible resins, which method includes the steps of:

preparing an oil-based solution by mixing together a hydrophobic crosslinking agent and one or more oily medium selected from the group consisting of ketone solvents having a solubility parameter of 9.0 (cal/cm$^{-3}$)$^{1/2}$ or less and hydrocarbon solvents to dissolve the hydrophobic crosslinking agent in the oily medium;

preparing an aqueous solution by mixing together a water-soluble organic compound, an aqueous medium, and an optional surfactant; and mixing together and agitating the oil-based solution and the aqueous solution;

15. A water-compatible resin composition which includes the crosslinking agent composition for water-compatible resins of any of 1 to 13 above and a water-compatible resin;

16. The water-compatible resin composition of 15 above, wherein the water-compatible resin includes a reactive group selected from carboxyl, amino and hydroxyl groups;

17. The water-compatible resin composition of 15 or 16, wherein the water compatible resin is of one or more type selected from the group consisting of polyester resins, acrylic resins, polyurethane resins, epoxy resins, styrene-acrylic resins, melamine resins, polyolefin resins and fluorocarbon resins;

18. The water-compatible composition of any of 15 to 17 above for use in wet-on-wet coating;

19. The water-compatible resin composition of any of 15 to 17 above for use in an adhesive, a textile finish, a coating or a paint;

20. A cured film of the water-compatible resin composition of any of 14 to 17 above; and 21. An article which includes a substrate and the cured film of 20 above formed on at least one side of the substrate, either directly or over one or more intervening layer.

Advantageous Effects of Invention

The inventive crosslinking agent composition for water-compatible resins, when used together with a water-compatible resin, gives a water-compatible resin composition having excellent storage stability.

Also, the water-compatible resin composition of the invention gives a cured product having good water resistance and good solvent resistance, and is well-suited for use in wet-on-wet coating.

Water-compatible resin compositions having such properties can be suitably used in a variety of applications, including paints (coatings), inks, textile finishes, adhesives and moldings.

DESCRIPTION OF EMBODIMENTS

The invention is described more fully below.

The inventive crosslinking agent composition for water-compatible resins is characterized by including a hydrophobic crosslinking agent, a water-soluble organic compound, one or more oily medium selected from the group consisting of ketone solvents having a solubility parameter of 9.0 (cal/cm$^{-3}$)$^{1/2}$ or less and hydrocarbon solvents, and also an aqueous medium.

As used herein, "water-compatible" means to have solubility or dispersibility in an aqueous medium. "Aqueous medium" refers to water and to hydrophilic solvents. "Hydrophilic solvent" refers to an organic solvent which is miscible in any proportion with water.

(1) Hydrophobic Crosslinking Agent

The hydrophobic crosslinking agent that is used may be one which is suitably selected from among hitherto known crosslinking agents such as carbodiimide compounds, isocyanate compounds, polyfunctional epoxy compounds, silane compounds, metallic compounds, oxazoline compounds, melamines, acid anhydride-containing compounds and oxetane compounds. Of these, one or more selected from among carbodiimide compounds, isocyanate compounds, polyfunctional epoxy compounds, silane compounds, metallic compounds, oxazoline compounds and melamines is preferred; one or more selected from among carbodiimide compounds and isocyanate compounds is more preferred; a carbodiimide compound is even more preferred.

The "hydrophobic" in hydrophobic crosslinking agent means to basically have no self-dispersibility or self-emulsifiability in water. In cases where the crosslinking agent composition for water-compatible resins of the invention is in the state of an emulsion, so long as the hydrophobic crosslinking agent is of a nature that enables it to be present in the oil phase and not in the aqueous phase, it may by itself have some degree of self-dispersibility and self-emulsifiability in water.

(a) Isocyanate Compound

The isocyanate compound is not particularly limited, provided that it is a hydrophobic compound having two or more isocyanate groups on the molecule. Ones that are suitably selected from among the various known diisocyanate compounds may be used.

Specific examples include aliphatic isocyanates such as hexamethylene diisocyanate, 1,4-tetramethylene diisocyanate, 2-methylpentane-1,5-diisocyanate, dodecamethylene diisocyanate, 2,2,4-trimethylhexamethylene diisocyanate and lysine diisocyanate; alicyclic diisocyanates such as 1,3-bis(isocyanatomethyl)cyclohexane, 1,4-bis(isocyanatomethyl)cyclohexane, 2,2-bis(4-isocyanatocyclohexyl) propane, isophorone diisocyanate (IPDI), norbornane diisocyanate, dicyclohexylmethane-4,4'-diisocyanate (HMDI), hydrogenated tolylene diisocyanate, hydrogenated xylene diisocyanate, hydrogenated diphenylmethane diisocyanate and hydrogenated tetramethylxylene diisocyanate; aromatic diisocyanates such as 2,2'-diphenylmethane diisocyanate, 4,4'-diphenylmethane diisocyanate, 2,4'-diphenylmethane diisocyanate, 4,4'-diphenyl ether diisocyanate, p-phenylene diisocyanate, m-phenylene diisocyanate, 3,3'-dimethoxy-4,4'-diphenyl diisocyanate, 2,4,6-triisopropylbenzene-1,3-diyl diisocyanate, o-tolidine diisocyanate, naphthylene diisocyanate, 2,4-tolylene diisocyanate, 2,6-tolylene diisocyanate and 3,3'-dimethyl-4,4'-diphenyl ether diisocyanate; aromatic aliphatic diisocyanates such as xylylene diisocyanate and tetramethylxylylene diisocyanate (TMXDI); trimerized isocyanurate, adduct and biuret forms of these; and any of these compounds that has been end-capped with a blocking agent or the like. One of these compounds may be used singly or two or more may be used in combination.

(b) Carbodiimide Compound

The carbodiimide compound is not particularly limited, provided that it is a compound having two or more carbodiimide groups on the molecule. Ones that are suitably selected from among the various known hydrophobic carbodiimide compounds may be used. The end groups may or may not be capped, although it is preferable for at least one end group, and more preferable for all end groups, to be capped with an end-capping compound.

The end-capping compound is preferably a compound having a group selected from among amino, isocyanate, epoxy, carboxyl and hydroxyl groups.

The end-capping compound may be a hydrophobic compound or a hydrophilic compound, so long as the capped carbodiimide compound is hydrophobic, although a hydrophobic compound is preferred.

From the standpoints of, for example, the terminal isocyanate group-capping reactivity and the performance of the resulting crosslinking agent, it is preferable for the end-capping compound to have a molecular weight of less than 340.

Compounds having a single amino group are exemplified by monoamines having a hydrocarbon group of 1 to 18 carbon atoms.

Specific examples include methylamine, ethylamine, propylamine, butylamine, pentylamine, hexylamine, octylamine, dodecylamine, diethylamine, dipropylamine, dibutylamine, cyclohexylamine, adamantanamine, allylamine, aniline, diphenylamine, 3-aminopropyltrimethoxysilane, 3-aminopropyltriethoxysilane, N-phenyl-3-aminopropyltrimethoxysilane, 2,2-difluoroamine, fluorobenzylamine, trifluoroethylamine, [[4-(trifluoromethyl)cyclohexyl]methyl]amine and derivatives thereof. One of these may be used alone or two or more may be used together.

Of these, from the standpoint of versatility and the like, cyclohexylamine is preferred.

When capped with a compound having a single amino group, the terminal isocyanate group forms a urea bond due to reaction with the amino group.

Compounds having a single isocyanate group are exemplified by monoisocyanates having a hydrocarbon group of 1 to 18 carbon atoms.

Specific examples include butyl isocyanate, pentyl isocyanate, hexyl isocyanate, octyl isocyanate, dodecyl isocyanate, cyclohexyl isocyanate, 1-adamantyl isocyanate, 3-isocyanatopropyltriethoxysilane, 2-isocyanatoethyl acrylate, benzyl isocyanate, 2-phenylethyl isocyanate, and derivatives of these. One of these may be used alone or two or more may be used together.

Of these, from the standpoint of reactivity and the like, cyclohexyl isocyanate is preferred.

When capped with a compound having a single isocyanate group, the terminal isocyanate group forms a carbodiimide bond (carbodiimide group) due to reaction with the isocyanate group on the end-capping compound.

Specific examples of compounds having a single epoxy group include 1,2-epoxyheptane, 1,2-epoxyhexane, 1,2-epoxydecane, 1,2-epoxy-5-hexene, ethyl glycidyl ether, 2-ethylhexyl glycidyl ether, glycidyl lauryl ether, allyl glycidyl ether, diethoxy(3-glycidyloxypropyl)methylsilane, 3-[2-(perfluorohexyl)ethoxy]-1,2-epoxypropane, and derivatives of these. One of these may be used alone or two or more may be used together.

When capped with a compound having a single epoxy group, the terminal isocyanate group forms an oxazolidone ring due to reaction with the epoxy group.

Compounds having a single carboxyl group are exemplified by monocarboxylic acids having a hydrocarbon group of 1 to 18 carbon atoms.

Specific examples include acetic acid, propionic acid, butanoic acid, pentanoic acid, hexanoic acid, heptanoic acid, octanoic acid, nonanoic acid, decanoic acid, cyclohexanecarboxylic acid, adamantaneacetic acid, phenylacetic acid, benzoic acid, undecenoic acid, and derivatives of these. One of these may be used alone or two or more may be used together.

When capped with a compound having a single carboxyl group, the terminal isocyanate group forms an amide bond due to reaction with the carboxyl group.

Compounds having a single hydroxyl group are exemplified by monoalcohols having a hydrocarbon group of 1 to 18 carbon atoms.

Specific examples include cyclohexanol, oleyl alcohol, benzyl alcohol, dodecyl alcohol, octanol, hexanol, pentanol, butanol, propanol and ethanol One of these may be used alone or two or more may be used together.

Of these, from the standpoint of reactivity, general applicability and the like, n-octanol, isopropanol, oleyl alcohol and benzyl alcohol are preferred.

When capped with a compound having a single hydroxyl group, the terminal isocyanate group forms a urethane bond due to reaction with the hydroxyl group.

From the standpoint of the water resistance of the water-compatible resin when cured, the above compounds are preferred as the monoalcohol. However, alkylene glycol derivatives such as alkylene glycol monoethers and alkylene glycol monoesters may also be used. Compounds of formula (1) below are suitable.

$$R^2(OCHR^1CH_2)_mOH \quad (1)$$

In the formula, $R^1$ is a hydrogen atom or a methyl group, $R^2$ is a hydrocarbon group of 1 to 18 carbon atoms or an acyl group of 1 to 18 carbon atoms, and m is an integer from 1 to 6.

The hydrocarbon group of 1 to 18 carbon atoms may be linear, branched or cyclic. Specific examples include linear, branched and cyclic alkyl groups such as methyl, ethyl, n-propyl, n-butyl, n-pentyl, n-hexyl, n-heptyl, n-octyl, decyl, dodecyl, tetradecyl, hexadecyl, octadecyl, isopropyl, isobutyl, sec-butyl, tert-butyl, decyl, 2-ethylhexyl, cyclopentyl and cyclohexyl groups.

Of these, alkyl groups of 1 to 7 carbon atoms is preferred. Alkyl groups of 1 to 4 carbon atoms are more preferred.

Specific examples of acyl groups of 1 to 18 carbon atoms include formyl, acetyl, propionyl, butyryl, isobutyryl, palmitoyl and benzoyl groups.

Of these, acyl groups of 1 to 7 carbon atoms are preferred. Acyl groups of 1 to 4 carbon atoms are more preferred.

The subscript 'm' is an integer from 1 to 6, more preferably from 1 to 5, and even more preferably from 1 to 4.

Specific examples of compounds of formula (1) include ethylene glycol monomethyl ether, diethylene glycol monomethyl ether, ethylene glycol monoethyl ether, ethylene glycol isopropyl ether, diethylene glycol monoisopropyl ether, ethylene glycol monobutyl ether, ethylene glycol monoisobutyl ether, ethylene glycol monohexyl ether, ethylene glycol mono-2-ethylhexyl ether, ethylene glycol monoallyl ether, ethylene glycol monophenyl ether, ethylene glycol monobenzyl ether, propylene glycol monomethyl ether, dipropylene glycol monomethyl ether, dipropylene glycol monopropyl ether, propylene glycol mono-n-butyl ether, and polymers of these; polyethylene glycol glyceryl ether, polypropylene glycol glyceryl ether and polypropylene glycol diglyceryl ether.

The above carbodiimide compounds can be prepared by various methods that use as the starting material any of the diisocyanate compounds mentioned above as examples of the isocyanate compound. A typical method of preparation involves preparing an isocyanate-terminated carbodiimide compound by the decarboxylative condensation of a diisocyanate compound accompanied by carbon dioxide removal (see, for example, U.S. Pat. No. 2,941,956, JP-B S47-33279, J. *Org. Chem.* 28, 2069-2075 (1963) and *Chemical Review* 1981, Vol. 81, No. 4, pp. 619-621). In cases where end capping is carried out, reaction with a given end-capping compound may be carried out, either after the carbodiimide compound has been synthesized or at the same time as such synthesis.

Aside from diisocyanate compounds, compounds having three or more isocyanate groups may also be used as the reaction starting material.

In particular, from the standpoint of availability, ease of carbodiimide compound synthesis and other considerations, the diisocyanate compound serving as the starting material of carbodiimide compound synthesis is preferably dicyclohexylmethane-4,4'-diisocyanate, isophorone diisocyanate, xylylene diisocyanate, hexamethylene diisocyanate, diphenylmethane diisocyanate or tetramethylxylylene diisocyanate, and is more preferably dicyclohexylmethane-4,4'-diisocyanate or isophorone diisocyanate.

Of these, from the standpoint of storage stability, aliphatic, alicyclic or aromatic aliphatic diisocyanates are more preferable than aromatic diisocyanates. In particular, HMDI, IPDI and TMXDI, which have a secondary diisocyanate group, are more preferred. From the standpoint of the film performance, HMDI and IPDI are even more preferred.

A carbodiimidization catalyst is generally used in the decarboxylative condensation of the diisocyanate compound.

Specific examples of carbodiimidization catalysts include phospholene oxides such as 1-phenyl-2-phospholene-1-oxide, 3-methyl-1-phenyl-2-phospholene-1-oxide, 1-ethyl-2-phospholene-1-oxide, 3-methyl-2-phospholene-1-oxide, and 3-phospholene isomers of these. These may be used singly or two or more may be used in combination.

Of these, from the standpoint of reactivity, 3-methyl-1-phenyl-2-phospholene-1-oxide is preferred.

The amount of carbodiimidization catalyst used, although not particularly limited, is preferably from 0.1 to 2.0 parts by weight per 100 parts by weight of the diisocyanate compound.

The decarboxylative condensation reaction can be carried out in the absence of a solvent, although a solvent may be used.

Specific examples of solvents that may be used include alicyclic ethers such as tetrahydrofuran, 1,3-dioxane and dioxolane; aprotic water-soluble solvents such as 1-(2-methoxy-2-methylethoxy)-2-propanol, diethylene glycol methyl ethyl ether, diethylene glycol diethyl ether, diethylene glycol dimethyl ether, dipropylene glycol methyl ethyl ether, dipropylene glycol diethyl ether, dipropylene glycol dimethyl ether, triethylene glycol methyl ethyl ether, triethylene glycol diethyl ether, triethylene glycol dimethyl ether, tetraethylene glycol methyl ethyl ether, tetraethylene glycol diethyl ether, tetraethylene glycol dimethyl ether, diethylene glycol monoethyl ether acetate, diethylene glycol monomethyl ether acetate, dipropylene glycol monoethyl ether acetate, dipropylene glycol monomethyl ether acetate, γ-butyrolactone, N-methylpyrrolidone, N-ethylpyrrolidone, N,N-dimethylformamide and N,N-dimethylacetamide; aromatic hydrocarbons such as benzene, toluene, xylene and ethylbenzene; halogenated hydrocarbons such as chlorobenzene, dichlorobenzene, trichlorobenzene, perclene, trichloroethane and dichloroethane; and cyclohexanone. These may be used singly or two or more may be used in combination.

When the reaction is carried out in a solvent, the concentration of the diisocyanate compound is preferably from 5 to 55 wt %, and more preferably from 5 to 20 wt %.

The reaction temperature, although not particularly limited, is preferably between 40° C. and 250° C., and more preferably between 80° C. and 195° C. When the reaction is carried out in a solvent, the reaction temperature is preferably between 40° C. and the boiling point of the solvent.

The reaction time is preferably from 0.5 to 80 hours, and more preferably from 1 to 70 hours.

The reaction atmosphere, although not particularly limited, is preferably a nitrogen gas, noble gas or other inert gas atmosphere.

In cases where end capping is carried out, when the end-capping compound is a compound having a single isocyanate group, an end-capped hydrophobic carbodiimide compound can be obtained by, for example, stirring and mixing together the end-capping compound and the diisocyanate compound at preferably between 40° C. and 200° C., and more preferably between 80° C. and 195° C., for a period of from about 10 to about 70 hours in the presence of a carbodiimidization catalyst.

Alternatively, in cases where the end-capping compound is other than a compound having a single isocyanate group, an end-capped hydrophobic carbodiimide compound can be obtained by, for example, adding the end-capping compound to an isocyanate-terminal carbodiimide compound at preferably between 40° C. and 250° C., more preferably between 80° C. and 195° C., and additionally stirring and mixing at between about 80° C. and about 200° C. for a period of from about 0.5 to about 5 hours.

The degree of polymerization of the carbodiimide compound (degree of polymerization of carbodiimide groups) is not particularly limited. However, to prevent gelation of the hydrophobic carbodiimide compound within an aqueous solvent, the degree of polymerization is preferably from 1 to 30, more preferably from 2 to 25, and even more preferably from 3 to 20.

In this Specification, "degree of polymerization of carbodiimide groups" refers to the number of carbodiimide groups that have formed within the carbodiimide compound due to the decarboxylative condensation of molecules of the diisocyanate compound.

The carbodiimide compound may be of one type used alone, or two or more may be used together.

(c) Polyfunctional Epoxy Compound

A polyfunctional epoxy compound suitably selected from among those having two or more epoxy groups per molecule may be used.

Specific examples include tris(2,3-epoxypropyl) isocyanurate, 1,4-butanediol diglycidyl ether, 1,2-epoxy-4-(epoxyethyl)cyclohexane, glycerol triglycidyl ether, diethylene glycol diglycidyl ether, 2,6-diglycidylphenyl glycidyl ether, 1,1,3-tris[p-(2,3-epoxypropoxy)phenyl]propane, diglycidyl 1,2-cyclohexanedicarboxylate, 4,4'-methylenebis(N,N-diglycidylaniline), 3,4-epoxycyclohexylmethyl-3,4-epoxy-cyclohexane carboxylate, trimethylolethane triglycidyl ether, bisphenol A diglycidyl ether and pentaerythritol polyglycidyl ether.

The polyfunctional epoxy compound may be acquired as a commercial product, specific examples of which include YH-434 and YH-434L (from Tohto Kasei KK); Epolead GT-401, GT-403, GT-301, GT-302 and Celloxide 2021 and 3000 (from Daicel Corporation); jER1001, 1002, 1003, 1004, 1007, 1009, 1010, 838, 807, 871, 872, 152, 154 and 180S75 (from Mitsubishi Chemical Corporation); EPPN201 and 200 (from Nippon Kayaku); EOCN-102, 103S, 104S, 1020, 1025 and 1027 (from Nippon Kayaku); Denacol EX-252, EX-611, EX-612, EX-614, EX-622, EX-411, EX-512, EX-522, EX-421, EX-313, EX-314 and EX-321 (from Nagase ChemteX Corporation); CY175, CY177 and CY179 (from Ciba-Geigy AG); Araldite CY-182, CY-192, CY-184 (from Ciba-Geigy AG); Epiclon 200 and 400 (from DIC Corporation); and ED-5661 and ED-5662 (from Celanese Coating KK).

(d) Silane Compound

A silane compound suitably selected from among hitherto known silane compounds may be used.

Specific examples include 3-aminopropyltrichlorosilane, 3-aminopropyltrimethoxysilane, 3-aminopropyltriethoxysilane, 3-aminopropyl(methyl)(dimethoxy)silane, 3-aminopropyl(methyl)(diethoxy)silane, 3-ureidopropyltrimethoxysilane, 3-ureidopropyltriethoxysilane, 3-(meth)acryloyloxypropyltrimethoxysilane, 3-(meth)acryloyloxypropyltriethoxysilane, vinyltrichlorosilane, vinyltrimethoxysilane, vinyltriethoxysilane, allyltrichlorosilane, allyltrimethoxysilane, allyltriethoxysilane, 3-glycidoxypropyltrimethoxysilane, 3-glycidoxypropyl(methyl)(diethoxy)silane, 3-glycidoxypropyltriethoxysilane, 3-mercaptopropyltrmethoxysilane, 3-mercaptopropyltriethoxysilane, 3-mercaptopropyl(methyl)(dimethoxy)silane, 3-mercaptopropyl(methyl)(diethoxy)silane, 7-octenyltrichlorosilane, 7-octenyltrimethoxysilane, 7-octenyltriethoxysilane, 8-glycidoxyoctyltrichlorosilane, 8-glycidoxyoctyltrimethoxysilane, 8-glycidoxyoctyltriethoxysilane, 8-(meth)acryloyloxyoctyltrichlorosilane, 8-(meth)acryloyloxyoctyltrimethoxysilane, 8-(meth)acryloyloxyoctyltriethoxysilane, 8-oxiranyloctyltrichlorosilane, 8-oxiranyloctyltrimethoxysilane and 8-oxiranyloctyltriethoxysilane. These may be of one type used alone or two or more may be used together.

These silane compounds may be synthesized by a known method or may be acquired as commercial products.

(e) Metallic Compound

Exemplary metallic compounds include metal alkoxides and organometallic compounds.

Specific examples of metal alkoxides include aluminum alkoxides such as aluminum isopropoxide, titanium alkoxides such as tetraethyl titanate, zirconium alkoxides such as tetraethyl zirconate, and metal alkoxide compounds in which an alkoxide group, preferably an alkoxide group of 1 to 18 carbon atoms, is bonded to a metal such as iron, calcium or barium. These may be in an associated form.

Specific examples of organometallic compounds include trialkylaluminum compounds such as triethylaluminum, dialkylzinc compounds such as diethylzinc, dialkyltin oxides such as dibutyltin oxide, and compounds having an Si—O—Al bond such as aluminum silicate.

(f) Oxazoline Compound

Exemplary oxazoline compounds include copolymers of an addition polymerizable 2-oxazoline having a substituent with an unsaturated carbon-carbon bond on the carbon at the 2 position (e.g., 2-isopropenyl-2-oxazoline) with another unsaturated monomer.

The oxazoline compound may be acquired as a commercial product, examples of which include Epocros K-2010E, K-2020E, K-2030E and RPS-1005 (all from Nippon Shokubai Co., Ltd.).

(g) Melamine

A melamine that is suitably selected from among melamine and melamine compounds having two or more methoxymethylene groups per molecule on the nitrogen atoms may be used.

Specific examples of compounds having two or more methoxymethylene groups per molecule on the nitrogen atoms of melamine include hexa(methoxymethyl)melamine and methylated melamine resins.

These compounds may be acquired as commercial products, examples of which include hexa(methoxymethyl)melamine CYMEL® 303 and the methylated melamine resins Nikalac® MW-30HM, MW-390, MW-100LM and MX-750LM (from Sanwa Chemical Co., Ltd.).

(h) Acid Anhydride Compound

The acid anhydride compound is not particularly limited, provided that it is a carboxylic anhydride obtained by the dehydrative condensation of two carboxylic acid molecules. Specific examples include compounds having a single acid anhydride group on the molecule, such as phthalic anhydride, tetrahydrophthalic anhydride, hexahydrophthalic anhydride, methyltetrahydrophthalic anhydride, methylhexahydrophthalic anhydride, nadic anhydride, methylnadic anhydride, maleic anhydride, succinic anhydride, octylsuccinic anhydride and dodecenyl succinic anhydride; and compounds having two acid anhydride groups on the molecule, such as pyromellitic anhydride, 3,4-dicarboxy-1,2,3,4-tetrahydro-1-naphthalene succinic dianhydride, bicyclo[3.3.0]octane-2,4,6,8-tetracarboxylic dianhydride, 3,3',4,4'-benzophenonetetracarboxylic dianhydride and 3,3',4,4'-biphenyltetracarboxylic dianhydride.

(i) Oxetane Compound

The oxetane compound is not particularly limited, provided that it has at least two oxetanyl groups per molecule. The oxetane compound may be acquired as a commercial product, specific examples of which include Aron Oxetane OXT-221 and OX-121 (from Toagosei Co., Ltd.).

(2) Water-Soluble Organic Compound

The water-soluble organic compound is an ingredient which has the role of increasing the storage stability of the water-compatible resin composition. Use can be made of one that is suitably selected from among hitherto known water-soluble organic compounds capable of use in water-compatible resin composition. In this invention, the use of one or more selected from among alkylene glycol compounds and water-soluble polymers (other than the alkylene glycol compounds) is especially preferred.

(a) Alkylene Glycol Compound

Alkylene glycol compounds are compounds which have an oxyalkylene group. From the standpoint of good water solubility and general applicability, one or more selected from among ethylene glycol compounds and propylene glycol compounds is preferred. (Poly)ethylene glycols, (poly)ethylene glycol ethers, (poly)ethylene glycol esters, (poly)propylene glycols, (poly)propylene glycol ethers and (poly)propylene glycol esters are more preferred.

In particular, compounds of formula (2) are more preferred as the alkylene glycol compound.

$$R^4(OCHR^3CH_2)_nOR^5 \qquad (2)$$

In formula (2), $R^3$ represents a hydrogen atom or a methyl group, although a hydrogen atom is preferred.

$R^4$ and $R^5$ are each independently a hydrogen atom, a hydrocarbon group of 1 to 18 carbon atoms, or an acyl group of 2 to 18 carbon atoms. Specific examples of these hydrocarbon groups and acyl groups include the same groups as those mentioned above in connection with formula (1).

In particular, from the standpoint of, for example, the miscibility with the water-compatible resin, $R^4$ and $R^5$ are preferably hydrogen atoms or alkyl groups of 1 to 3 carbon atoms, with a combination in which one is a hydrogen atom and the other is a methyl group or an ethyl group being more preferred, and a combination in which one is a hydrogen atom and the other is a methyl group being still more preferred.

From the standpoint of, for example, the miscibility with the water-compatible resin, the subscript 'n' is preferably an integer from 1 to 70, more preferably an integer from 1 to 50, and even more preferably an integer from 1 to 20.

Specific examples of alkylene glycol compounds include polyethylene glycol, polyethylene glycol monomethyl ether, polyethylene glycol dimethyl ether, polyethylene glycol monolauryl ether, polypropylene glycol and polyethylene glycol monobutyl ether acetate. Of these, taking into account the storage stability of the water-compatible resin composition, polyethylene glycol, polyethylene glycol monomethyl ether, polyethylene glycol dimethyl ether and polyethylene glycol monolauryl ether are preferred.

The molecular weight of the alkylene glycol compound is not particularly limited. However, the weight-average molecular weight is preferably at least 300, more preferably from 300 to 1,000, and even more preferably from 400 to 900.

Here and below, the weight-average molecular weight is a polystyrene equivalent value obtained by gel permeation chromatography.

(b) Water-Soluble Polymer

The water-soluble polymer is not particularly limited, provided that it is a water-soluble polymer other than the above alkylene glycol compound. It should be a water-soluble compound having a recurring unit structure composed of units other than oxyalkylene groups. The number of recurring units and the molecular weight are not limited to ranges typical of polymers, and include also oligomer ranges.

Examples include polymeric compounds which exhibit water solubility because they have on the molecule an ether group, hydroxyl group, carboxyl group, sulfonic group, sulfate group, amino group, imino group, quaternary ammonium cation or the like.

Specific examples of water-soluble polymers include polyvinylpyrrolidone, polyvinyl alcohol, polyvinyl methyl ether, polyacrylamide, polyethyleneimine, vinyl alcohol-vinyl acetate copolymers, partial formals of polyvinyl alcohol, partial butyrals of polyvinyl alcohol, vinyl pyrrolidone-vinyl acetate copolymers, polyacrylates, polyvinyl sulfates, poly(4-vinylpyridine) salts, polyamides, polyallylamine salts, condensed naphthalenesulfonic acid salts, styrene-(meth)acrylic acid salt copolymers, (meth)acrylic acid ester-(meth)acrylic acid salt copolymers, styrene-itaconic acid salt copolymers, itaconic acid ester-itaconic acid salt copolymers, vinyl naphthalene-(meth)acrylic acid salt copolymers and vinyl naphthalene-itaconic acid salt copolymers; cellulose derivatives such as carboxymethyl cellulose; starch derivatives such as water-soluble starch, starch esters, starch xanthates and starch acetates; and gelatins. Of these, polyvinylpyrrolidone, polyvinyl alcohol, polyethyleneimine, polyacrylic acid, polyacrylamide, carboxymethyl cellulose, starch and gelatin are preferred. Polyvinylpyrrolidone and polyvinyl alcohol are more preferred.

The water-soluble polymeric compound may have any molecular weight within, as mentioned above, the oligomer to polymer range. However, to increase the storage stability of the water-compatible resin composition, the weight-average molecular weight is preferably from 5,000 to 2,000,000, more preferably from 8,000 to 300,000, and even more preferably from 10,000 to 200,000.

In the inventive crosslinking agent composition for water-compatible resins, the amount of water-soluble organic compound included is not particularly limited. However, to increase the storage stability of the water-compatible resin composition and to increase the solvent resistance of the cured product obtained from this water-compatible resin composition, the amount per 100 parts by weight of the hydrophobic crosslinking agent is preferably from 0.03 to 50 parts by weight, more preferably from 0.1 to 40 parts by weight, even more preferably from 0.15 to 35 parts by weight, and still more preferably from 0.18 to 25 parts by weight.

(3) Oily Medium

One or more oily medium selected from ketone solvents having a solubility parameter (SP) of 9.0 $(cal/cm^{-3})^{1/2}$ or less and hydrocarbon solvents is used in this invention.

The hydrocarbon solvent may be any aromatic hydrocarbon solvent or aliphatic hydrocarbon solvent, or may be a mixed solvent of these.

Specific examples of aromatic hydrocarbon solvents include toluene, p-xylene, o-xylene, m-xylene and ethylbenzene.

Specific examples of aliphatic hydrocarbon solvents include pentane, n-hexane, n-heptane, n-octane, n-decane, decalin, cyclohexane, methyl cyclohexane and ethyl cyclohexane.

The hydrocarbon solvent may be a petroleum-based hydrocarbon solvent. Various types of commercially available petroleum-based hydrocarbon solvents may be used.

Specific examples of such organic solvents include IP Solvent 1620, IP Solvent 1016, IP Solvent 2028, IP Solvent 2835 ad IP Clean LX (from Idemitsu Kosan Company, Ltd.; all are isoparaffinic); Shellsol S (from Shell Chemicals Japan Ltd.; isoparaffinic); Isopar C, Isopar E, Isopar G, Isopar H, Isopar L, Isopar M and Isopar V (Exxon Mobil Corporation; all are isoparaffinic); Isosol 200, Isosol 300 and Isosol 400 (Nippon Petrochemicals Co., Ltd.; all are isoparaffinic); and Norpar 10, Norpar 12, Norpar 13 and Norpar 15 (Exxon Mobil Corporation; all are n-paraffinic).

The ketone solvent may be any ketone having an SP of 9.0 $(cal/cm^{-3})^{1/2}$ or less. The SP in this invention is an estimated value at 25° C. obtained by the latent heat of vaporization method. For example, use can be made of the values mentioned in the *Polymer Data Handbook* (The Society of Polymer Science, Japan, ed.; published by Baifukan in January 1986).

Ketone solvents that may be used in the invention include methyl isopropyl ketone, methyl butyl ketone, methyl propyl ketone, methyl hexyl ketone, 2-heptanone, 3-heptanone and 4-heptanone. From the standpoint of the industrial availability, 2-heptanone is preferred.

The above hydrocarbon solvents and ketone solvents may each be of one type used alone or may be of two or more types used together; a hydrocarbon solvent and a ketone solvent may also be used together.

The above hydrocarbon solvents and ketone solvents may each be of one type used alone or may be of two or more types used together; a hydrocarbon solvent and a ketone solvent may also be used together.

Of these, toluene is preferred because of its ability to dissolve the hydrophobic crosslinking agent, because it does not vaporize during emulsification (preferred temperature, between 20° C. and 100° C.) and because it evaporates during film formation (e.g., at 80° C. in the subsequently described examples) and does not remain in the film, enabling the formation of a film free of bubbles and crazing.

Also, hexane is preferred because it does not remain in the film even when the film-forming temperature is a low temperature.

The amount of oily medium included in the inventive crosslinking agent composition for water-compatible resins is not particularly limited. However, to increase the storage stability of the water-compatible resin composition and also the water resistance and solvent resistance of cured products obtained from the water-compatible resin composition, the amount included per 100 parts by weight of the hydrophobic crosslinking agent is preferably from 10 to 250 parts by weight, more preferably from 15 to 200 parts by weight, and even more preferably from 30 to 170 parts by weight.

Also, in the inventive crosslinking agent composition for water-compatible resins, a hydrophobic organic solvent other than the above ketone solvents having a given SP value and the above hydrocarbon solvents may be used in the composition for the purpose of creating an oil phase with the above hydrophobic crosslinking agent and the oily medium.

Examples of such organic solvents include the following ester solvents: methyl acetate, ethyl acetate, n-propyl acetate, butyl acetate and isobutyl acetate. These may be used singly or two or more may be used together.

When such another hydrophobic organic solvent is used, the amount thereof included is not particularly limited so long as it is less than the amount in which the ketone solvent having a given SP and/or the hydrocarbon solvent are used, and is preferably from 1 to 30 parts by weight per 100 parts by weight of the ketone solvent having a specific SP and/or the hydrocarbon solvent.

(4) Aqueous Medium

The aqueous medium used in this invention may be either water or a hydrophilic organic solvent. From the standpoint of the environmental impact and to reduce costs, a water-containing medium is desirable, with a medium containing at least 50 wt % of water being preferred, and a medium consisting entirely of water being more preferred.

The hydrophilic organic solvent is exemplified by hydrophilic solvents such as alcohols, ethers, ketones and esters. These may be used singly or two or more may be used together.

Specific examples of hydrophilic alcohols include methanol, isopropanol, n-butanol, 2-ethylhexyl alcohol, ethylene glycol and propylene glycol.

Specific examples of hydrophilic ethers include ethylene glycol monoethyl ether, ethylene glycol monobutyl ether, ethylene glycol monohexyl ether, propylene glycol monoethyl ether, 3-methoxy-3-methylbutanol, diethylene glycol monomethyl ether, diethylene glycol monoethyl ether and tetrahydrofuran.

A specific example of a hydrophilic ketone is acetone.

Specific examples of hydrophilic esters include ethylene glycol monoethyl ether acetate and ethylene glycol monobutyl ether acetate.

The amount of aqueous medium included in the inventive crosslinking agent composition for water-compatible resins is not particularly limited. However, to increase the storage stability of the water-compatible resin composition and enhance such properties as the water resistance and solvent resistance of the cured product obtained from the water-compatible resin composition, the amount is preferably from 25 to 300 parts by weight, more preferably from 50 to 250 parts by weight, and even more preferably from 80 to 150 parts by weight, per 100 parts by weight of the hydrophobic crosslinking agent.

(5) Surfactant

The inventive crosslinking agent composition for water-compatible resins may optionally include a surfactant.

The surfactant is a compound which has a hydrophilic moiety and a hydrophobic moiety. It acts at the interface between the aqueous medium and the hydrophobic substance, and serves to make both substances forming the interface more compatible with each other. In this invention, a surfactant other than the above-described alkylene glycol-type compounds and water-soluble polymers may be suitably selected from among hitherto known surfactants and used.

Specific examples of the surfactant include nonionic surfactants such as sorbitan monolaurate, polyoxyethylene sorbitan monolaurate, polyoxyethylene glyceryl cocoate, polyoxyethylene castor oil, polyglyceryl oleate, polyoxyethylene lauryl amine and polyoxyethylene sorbitol tetraoleate; anionic surfactants such as sodium dodecylbenzenesulfonate and other alkylbenzenesulfonates, sodium dodecyl sulfate, sodium lauryl sulfate and other alkyl sulfates, sodium N-cocoyl methyl taurate, sodium di-2-ethylhexyl sulfosuccinate, sodium 2-ethylhexyl sulfate and sodium a-sulfo fatty acid methyl ester; cationic surfactants such as benzalkonium chloride, dodecyltrimethylammonium chloride, tetradecylamine acetate, didecyldimethylammonium chloride and tetradecyldimethylbenzylammonium chloride; and amphoteric surfactants such as cocoyl dimethylaminoacetic acid betaine, cocoamidopropyl dimethylaminoacetic acid betaine, sodium lauryl diaminoethyl glycine and monosodium laurylaminodiacetate.

Of these, to increase the storage stability of the water-compatible resin composition, anionic surfactants such as alkylbenzenesulfonates and alkyl sulfates, and the surfactants benzalkonium chloride and polyoxyethylene sorbitol tetraoleate are preferred; anionic surfactants are more preferred; alkylbenzenesulfonates, alkyl sulfates and sodium N-cocoyl methyl taurate are even more preferred; and alkylbenzenesulfonates and sodium N-cocoyl methyl taurate are still more preferred.

The HLB value of the surfactant is not particularly limited. However, to prepare a crosslinking agent composition for water-compatible resins that is in the form of an oil-in-water type emulsion, the Griffin's HLB value is preferably at least 7, more preferably at least 9, and even more preferably at least 10.

In the inventive crosslinking agent composition for water-compatible resins, when a surfactant is used, the amount included is not particularly limited. However, in order to increase the storage stability of the water-compatible resin composition and the water resistance and solvent resistance of the cured product obtained from this water-compatible resin composition, the amount included per 100 parts by weight of the hydrophobic crosslinking agent is preferably from 0.03 to 50 parts by weight, more preferably from 0.1 to 40 parts by weight, even more preferably from 0.15 to 35 parts by weight, and still more preferably from 0.18 to 25 parts by weight.

(6) Other Ingredients

In addition to the above-described ingredients, the inventive crosslinking agent composition for water-compatible resins may include additives such as antioxidants, ultraviolet absorbers, thickeners, antifoaming agents and wettability enhancers, provided that doing so does not detract from the advantageous effects of the invention.

(7) Method for Producing Crosslinking Agent Composition for Water-Compatible Resin The inventive crosslinking agent composition for water-compatible resins can be produced by mixing together in any order and stirring the various essential ingredients and optional ingredients. However, to efficiently produce a crosslinking agent composition for water-compatible resins in the form of an emulsion in which an oil phase containing the hydrophobic crosslinking agent and the oily medium are dispersed in the aqueous medium, production is preferably carried out by mixing together and stirring an oil-based solution prepared by dissolving the hydrophobic crosslinking agent in one or more oily medium selected from ketone solvents having a specific SP and hydrocarbon solvents with an aqueous solution prepared by mixing together the water-soluble organic compound, the aqueous medium and the optional surfactant. At the time of oil-based solution preparation, the other hydrophobic organic solvent described above may be used for the purpose of dissolving the hydrophobic crosslinking agent in the hydrocarbon solvent or ketone solvent.

Mixing and stirring of the oil-based solution with the aqueous solution is not particularly limited, and may be carried out by a known method of agitation using, for example, a homogenizer, a rotating blade or a magnetic stirrer. The use of a homogenizer is preferred.

The temperature, stirring time and other conditions during mixing are not particularly limited. However, from the standpoint of efficient emulsification, stirring and mixing at between 20° C. and 100° C. for a period of from 0.5 to 3 hours is preferred.

(8) Water-Compatible Resin Composition and Cured Product Thereof

The water-compatible resin composition of the invention includes the above-described crosslinking agent for water-compatible resins and the above-described water-compatible resin. Because it includes a crosslinking agent composition for water-compatible resins that has an excellent storage stability when present together with a water-compatible resin, for a period of at least about one week following production, a crosslinking reaction triggered by heating or the like can be carried out, although this varies also with, for example, the type of water-compatible resin and the additives that are included.

The water-compatible resin is not particularly limited, provided that it is a resin having water solubility or water dispersibility and is a resin having a functional group which is capable of reacting with the crosslinking agent used in the crosslinking agent composition and being crosslinked, such as a hydroxyl group, carboxyl group, amino group or isocyanate group. A resin having one or more functional group selected from hydroxyl, carboxyl and amino groups is preferred.

Specific examples of water-compatible resins include water-compatible polyester resins, water-compatible acrylic resins, water-compatible polyurethane resins, water-compatible epoxy resins, water-compatible styrene-acrylic resins, water-compatible melamine resins, water-compatible polyolefin resins and water-compatible fluorocarbon resins. Of these, preferred use can be made of water-compatible polyester resins, water-compatible acrylic resins, water-compatible polyurethane resins and water-compatible epoxy resins. One type may be used alone or two or more types may be used together.

The water-compatible resin may be acquired as a commercial product. Exemplary commercial products include the water-compatible polyurethane resin Suncure® 777 (from Lubrizol), the water-compatible acrylic resin AC261P (from Dow Chemical) and the water-compatible polyester resin Plas Coat Z-730 (from Goo Chemical Co., Ltd.).

The proportions in which the hydrophobic crosslinking agent within the crosslinking agent composition for water-compatible resins and the water-compatible resin are included in the water-compatible resin composition of the invention may be suitably set according to, for example, the type of water-compatible resin and the properties desired of the cured product obtained from the water-compatible resin. However, from the standpoint of the balance between crosslink reactivity and cost, for example, the amount of hydrophobic crosslinking agent per 100 parts by weight of the water-compatible resin is preferably from 0.2 to 40 parts by weight, more preferably from 0.5 to 20 parts by weight, and even more preferably from 1 to 15 parts by weight.

The water-compatible resin composition of the invention may include, depending on the intended use, application and the like, various added ingredients such as colorants, fillers, dispersants, plasticizers, thickeners, ultraviolet absorbers and antioxidants, insofar as doing so does not detract from the advantageous effects of the invention.

The water-compatible resin composition of the invention can be produced by mixing to together in any order and stirring the crosslinking agent composition for water-compatible resins, the water-compatible resin and other ingredients that are optionally added. The method of stirring and mixing is not particularly limited. For example, a known method that uses a rotating blade, magnetic stirrer or the like may be used.

The temperature, time and other conditions during mixing differ according to, for example, the make-up of the crosslinking agent composition for water-compatible resins and the type of water-compatible resin. However, from the standpoint of efficient and uniform mixture, the mixing temperature is preferably between 0° C. and 100° C., more preferably between 10° C. and 50° C., and even more preferably between 20° C. and 30° C.; and the mixing time is preferably from 0.1 to 2 hours, and more preferably from 0.3 to 1 hour.

A cured product (cured film) can be produced by applying the resin composition of the invention directly onto a given substrate or over another layer such as a primer layer and then heating it to induce a crosslinking agent.

A known method may be suitably used here as the method of application. Examples of such methods include brush coating, padding, spray coating, hot spray coating, airless spray coating, roller coating, curtain flow coating, flow coating, dip coating and knife edge coating.

The heating method is not particularly limited. For example, an electric heating oven, an infrared heating oven or a high-frequency heating oven may be used.

The heating temperature depends on, for example, the composition of the crosslinking agent composition for water-compatible resins and the type of water-compatible resin and is suitably set, from the standpoint of promoting the crosslinking reaction, within a range where discoloration and thermal breakdown of the water-compatible composition does not occur.

Because the water-compatible resin composition of the invention provides a cured product having excellent water resistance and solvent resistance, it can be suitably used in various applications such as paints, inks, textile finishes, adhesives, coatings and moldings.

Also, when wet-on-wet coating is carried out, because crosslinking reactions are promoted in the film formed of the inventive water-compatible resin composition, bleeding and poor adhesion between layered coats do not readily arise, enabling a good film to be efficiently formed. The inventive composition can thus be suitably used also in wet-on-wet coating.

In addition, the water-compatible resin composition of the invention can be suitably used also in applications that call for other properties based on excellent crosslinkability, such as high tensile strength, excellent heat resistance, durability, bonding properties, adhesion, chipping resistance, scratch resistance and compatibility. Accordingly, expanded use in such fields as, in particular, automotive interiors and exteriors, building interiors and exteriors, heavy-duty anticorrosion coating, food packaging and health care can be expected.

EXAMPLES

Examples and Comparative Examples are given below to more fully illustrate the invention, although the invention is not limited by these Examples.

The molecular weights appearing below are calculated values or catalog values.

[1] Synthesis of Polycarbodiimide Compounds

Details on the starting compounds used in the following Synthesis Examples are given below.

(1) Diisocyanate Compounds

HMDI: Dicyclohexylmethane-4,4'-diisocyanate (Tokyo Chemical Industry; molecular weight, 262.35)

IPDI: Isophorone diisocyanate (Tokyo Chemical Industry; molecular weight, 222.29)

HDI: Hexamethylene diisocyanate (Tokyo Chemical Industry; molecular weight, 168.19)

XDI: m-Xylylene diisocyanate (Tokyo Chemical Industry; molecular weight, 188.19)

TMXDI: Tetramethylxylylene diisocyanate (Tokyo Chemical Industry; molecular weight, 244.29)

MDI: 4,4'-Diphenylmethane diisocyanate (Tokyo Chemical Industry; molecular weight, 250.25)

(2) End-Blocking Compounds

CHI: Cyclohexyl isocyanate (Tokyo Chemical Industry; molecular weight, 125.17)

CHA: Cyclohexylamine (Tokyo Chemical Industry; molecular weight, 99.18)

OA: n-Octanol (Tokyo Chemical Industry; molecular weight, 130.23)

MPEG200: Polyethylene glycol monomethyl ether (Tokyo Chemical Industry; molecular weight, 190 to 210)

MPEG550: Polyethylene glycol monomethyl ether (Tokyo Chemical Industry; molecular weight, 525 to 575)

The degree of polymerization of the carbodiimide groups in the Synthesis Examples below was determined as follows according to the synthesis method.

(1) In cases where a polycarbodiimide compound was synthesized by including at the same time a diisocyanate compound and an end-capping compound, the carbodiimide group degree of polymerization is a value based on calculation.

(2) In cases where an isocyanate-terminated polycarbodiimide was synthesized by a polycarbodiimidization reaction on a diisocyanate compound, following which a polycarbodiimide compound was synthesized by carrying out a terminal isocyanate group blocking reaction, the degree of polymerization of the carbodiimide groups on the isocyanate-terminated polycarbodiimide was determined by potentiometric titration (using the COM-900 automatic titrator from Hiranuma Co., Ltd.). Specifically, a toluene solution of di-n-butylamine in a known concentration was mixed together with the isocyanate-terminated polycarbodiimide obtained by the carbodiimidization reaction, causing the terminal isocyanate groups and the di-n-butylamine to react. The remaining di-n-butylamine was neutralization titrated with a standard solution of hydrochloric acid, and the remaining amount of isocyanate groups (amount of terminal NCO groups [wt %]) was computed. The carbodiimide group degree of polymerization was determined from this amount of terminal NCO groups.

Synthesis Example 1

One hundred parts by weight of HMDI, 10.6 parts by weight of CH and 1.2 parts by weight of the carbodiimidization catalyst 3-methyl-1-phenyl-2-phospholene 1-oxide were placed in a reactor equipped with a reflux condenser and a stirrer, and the reaction was effected by stirring at 180° C. for 47 hours under a stream of nitrogen. Disappearance of the isocyanate group absorption peak at a wavelength of 2200-2300 $cm^{-1}$ was confirmed by IR spectroscopy (using the FTIR-8200PC Fourier transform IR spectrophotometer from Shimadzu Corporation; the same applies below).

The reaction product was then removed from the reactor and cooled to room temperature (25° C.), giving a hydrophobic polycarbodiimide compound (P1) in the form of a clear, light-yellow liquid (molecular weight, 2,168; carbodiimide group degree of polymerization, 8; number of carbodiimide groups on one molecule, 10).

Synthesis Example 2

One hundred parts by weight of HMDI and 0.5 part by weight of 3-methyl-1-phenyl-2-phospholene 1-oxide were placed in a reactor equipped with a reflux condenser and a stirrer, and carbodiimidization was carried out by stirring and mixing at 180° C. for 28 hours under a stream of nitrogen, giving an isocyanate-terminated polycarbodiimide compound.

The resulting isocyanate-terminated polycarbodiimide was measured by IR spectroscopy and an absorption peak due to carbodiimide groups was confirmed at a wavelength of about 2150 $cm^{-1}$. The amount of terminal NCO groups was 2.35 wt % and the carbodiimide group degree of polymerization was 15.2.

Next, 84.3 parts by weight of the resulting isocyanate-terminated polycarbodiimide compound was melted at 160° C., 4.7 parts by weight of CHA (same molar equivalent as terminal isocyanate groups on isocyanate-terminated polycarbodiimide compound) was added, and the mixture was heated to 180° C. and reacted for 1.5 hours under stirring.

Disappearance of the isocyanate group absorption peak at a wavelength of 2200-2300 $cm^{-1}$ was confirmed by IR spectroscopy, following which a clear, yellow liquid-like reaction product was removed from the reactor. The reaction product was cooled to room temperature (25° C.) and milled using a roll granulator, giving a hydrophobic polycarbodiimide compound (P2) (molecular weight, 3,779).

Synthesis Example 3

One hundred parts by weight of HMDI and 0.5 part by weight of 3-methyl-1-phenyl-2-phospholene 1-oxide were placed in a reactor equipped with a reflux condenser and a stirrer, and carbodiimidization was carried out by stirring and mixing at 170° C. for 18 hours under a stream of nitrogen, giving an isocyanate-terminated polycarbodiimide compound.

The resulting isocyanate-terminated polycarbodiimide was measured by IR spectroscopy and an absorption peak due to carbodiimide groups was confirmed at a wavelength of about 2150 cm$^{-1}$. The amount of terminal NCO groups was 5.07 wt % and the carbodiimide group degree of polymerization was 6.4.

Next, 85.5 parts by weight of the resulting isocyanate-terminated polycarbodiimide compound was melted at 150° C., 13.4 parts by weight of CHA (same molar equivalent as terminal isocyanate groups on isocyanate-terminated poly-carbodiimide compound) was added, and the mixture was heated to 180° C. under stirring and reacted for 2 hours.

Disappearance of the isocyanate group absorption peak at a wavelength of 2200-2300 cm$^{-1}$ was confirmed by IR spectroscopy, following which the reaction product was removed from the reactor. The reaction product was cooled to room temperature (25° C.), giving a hydrophobic poly-carbodiimide compound (P3) in the form of a clear, light-yellow liquid (molecular weight, 1,920).

Synthesis Example 4

Aside from using 20.5 parts by weight of MPEG200 instead of OA, a hydrophobic polycarbodiimide compound (P4) (molecular weight, 2,060) was obtained in the same way as in Synthesis Example 3.

Synthesis Example 5

One hundred parts by weight of IPDI, 28.1 parts by weight of CHI and 2.0 parts by weight of 3-methyl-1-phenyl-2-phospholene 1-oxide were placed in a reactor equipped with a reflux condenser and a stirrer, and the reaction was carried out by stirring and mixing at 150° C. for 24 hours under a stream of nitrogen. Disappearance of the isocyanate group absorption peak at a wavelength of 2200-2300 cm$^{-1}$ was confirmed by IR spectroscopy.

The reaction product was then removed from the reactor and cooled to room temperature (25° C.), giving a hydro-phobic polycarbodiimide compound (P5) in the form of a clear, light-yellow liquid (molecular weight, 918; carbo-diimide group degree of polymerization, 3; number of carbodiimide groups on one molecule, 5).

Synthesis Example 6

One hundred parts by weight of HDI, 28.1 parts by weight of CHI and 2.0 parts by weight of 3-methyl-1-phenyl-2-phospholene 1-oxide were placed in a reactor equipped with a reflux condenser and a stirrer, and the reaction was carried out by stirring and mixing at 150° C. for 24 hours under a stream of nitrogen. Disappearance of the isocyanate group absorption peak at a wavelength of 2200-2300 cm$^{-1}$ was confirmed by IR spectroscopy.

The solvent was then distilled off under reduced pressure and the reaction product was removed from the reactor and cooled to room temperature (25° C.), giving a hydrophobic polycarbodiimide compound (P6) in the form of a clear, light-yellow liquid (molecular weight, 702; carbodiimide group degree of polymerization, 3; number of carbodiimide groups on one molecule, 5).

Synthesis Example 7

One hundred parts by weight of XDI, 33.3 parts by weight of CHI, 2.0 parts by weight of 3-methyl-1-phenyl-2-phos-pholene 1-oxide and 100 parts by weight of propylene glycol monomethyl ether acetate were placed in a reactor equipped with a reflux condenser and a stirrer, and the reaction was carried out by stirring and mixing at 150° C. for 24 hours under a stream of nitrogen. Disappearance of the isocyanate group absorption peak at a wavelength of 2200-2300 cm$^{-1}$ was confirmed by IR spectroscopy.

The solvent was then distilled off under reduced pressure and the reaction product was removed from the reactor and cooled to room temperature (25° C.), giving a hydrophobic polycarbodiimide compound (P7) in the form of a clear, light-yellow liquid (molecular weight, 782; carbodiimide group degree of polymerization, 3; number of carbodiimide groups on one molecule, 5).

Synthesis Example 8

One hundred parts by weight of TMXDI and 1.0 part by weight of 3-methyl-1-phenyl-2-phospholene 1-oxide were placed in a reactor equipped with a reflux condenser and a stirrer, and carbodiimidization was carried out by stirring and mixing at 170° C. for 18 hours under a stream of nitrogen, giving an isocyanate-terminated polycarbodiimide compound.

The resulting isocyanate-terminated polycarbodiimide was subjected to IR spectroscopy and an absorption peak due to carbodiimide groups was confirmed at a wavelength of about 2150 cm$^{-1}$. The amount of terminal NCO groups was 5.506 wt % and the carbodiimide group degree of polymerization was 6.4.

Next, 84.4 parts by weight of the resulting isocyanate-terminated polycarbodiimide compound was melted at 150° C., 14.4 parts by weight of OA (same molar equivalent as terminal isocyanate groups on isocyanate-terminated poly-carbodiimide compound) was added, and the mixture was heated to 180° C. and reacted for 2 hours under stirring.

Disappearance of the isocyanate group absorption peak at a wavelength of 2200-2300 cm$^{-1}$ was confirmed by IR spectroscopy, following which the reaction product was removed from the reactor. The reaction product was cooled to room temperature (25° C.), giving a hydrophobic poly-carbodiimide compound (P8) in the form of a clear, light yellow liquid (molecular weight, 1,787).

Synthesis Example 9

One hundred parts by weight of MDI, 26.6 parts by weight of OA and 1.3 parts by weight of 3-methyl-1-phenyl-2-phospholene 1-oxide were placed in a reactor equipped with a reflux condenser and a stirrer, and reacted by stirring and mixing at 100° C. for 2 hours under a stream of nitrogen. Disappearance of the isocyanate group absorption peak at a wavelength of 2200-2300 cm$^{-1}$ was confirmed by IR spectroscopy. A hydrophobic polycarbodiimide compound (P9) in the form of a white solid was obtained (molecular weight, 1,095; carbodiimide group degree of polymerization, 3; number of carbodiimide groups on one molecule, 5).

Comparative Synthesis Example 1

Aside from using 56.7 parts by weight of MPEG550 instead of OA, a hydrophilic polycarbodiimide compound (Q1) (molecular weight, 2,760) was obtained in the same way as in Synthesis Example 3.
[2] Preparation of Crosslinking Agent Compositions for Water-Compatible Resins

Example A1

An oil-based solution was prepared by mixing together and stirring the following at 25° C.: 30 parts by weight of the hydrophobic polycarbodiimide compound obtained in Synthesis Example 1 (P1) as a hydrophobic crosslinking agent and 30 parts by weight of toluene as a hydrocarbon solvent.

Separately, an aqueous solution was prepared by mixing together and stirring the following at 25° C.: 0.8 part by weight of polyvinyl alcohol (abbreviated below as "PVA"; from Kuraray Co., Ltd.; molecular weight, 120,000) as a water-soluble organic compound, 0.3 part by weight of sodium dodecylbenzenesulfonate (abbreviated below as "LAS"; from Kao Corporation; anionic) as a surfactant and 38.90 parts by weight of deionized water as an aqueous medium.

The oil-based solution and the aqueous solution obtained above were mixed together and stirred at high speed and 25° C., giving Crosslinking Agent Composition 1 for Water-Compatible Resins in the form of an oil-in-water emulsion.

Example A2

Aside from changing the surfactant LAS to sodium lauryl sulfate (abbreviated below as "LS"; from Kao Corporation; anionic), Crosslinking Agent Composition 2 for Water-Compatible Resins in the form of an oil-in-water emulsion was obtained in the same way as in Example A1.

Example A3

Aside from changing the surfactant LAS to sodium N-cocoyl methyl taurate (abbreviated below as "CM"; from Kao Corporation; anionic), Crosslinking Agent Composition 3 for Water-Compatible Resins in the form of an oil-in-water emulsion was obtained in the same way as in Example A1.

Example A4

Aside from changing the 30 parts by weight of the hydrocarbon solvent toluene to 25 parts by weight of Isopar M (Exxon Mobil Corporation) and 5 parts by weight of toluene, Crosslinking Agent Composition 4 for Water-Compatible Resins in the form of an oil-in-water emulsion was obtained in the same way as in Example A1.

Example A5

Aside from changing the hydrocarbon solvent toluene to hexane, Crosslinking Agent Composition 5 for Water-Compatible Resins in the form of an oil-in-water emulsion was obtained in the same way as in Example A2.

Example A6

Aside from changing the surfactant LAS to polyoxyethylene sorbitol tetraoleate (abbreviated below as "SBM"; from NOF Corporation; nonionic), Crosslinking Agent Composition 6 for Water-Compatible Resins in the form of an oil-in-water emulsion was obtained in the same way as in Example A1.

Example A7

Aside from changing the surfactant LAS to benzalkonium chloride (abbreviated below as "BZC"; from NOF Corporation; cationic), Crosslinking Agent Composition 7 for Water-Compatible Resins in the form of an oil-in-water emulsion was obtained in the same way as in Example A1.

Example A8

Aside from changing PVA (molecular weight, 120,000) to PVA (Kuraray Co., Ltd.; molecular weight, 10,000), Crosslinking Agent Composition 8 for Water-Compatible Resins in the form of an oil-in-water emulsion was obtained in the same way as in Example A1.

Example A9

Aside from changing PVA (molecular weight, 120,000) to PVA (Kuraray Co., Ltd.; molecular weight, 1,000,000), Crosslinking Agent Composition 9 for Water-Compatible Resins in the form of an oil-in-water emulsion was obtained in the same way as in Example A1.

Example A10

Aside from changing PVA (molecular weight, 120,000) to polyvinylpyrrolidone (abbreviated below as "PVP"; Pitzcol K50, from DKS Co., Ltd.; molecular weight, 250,000), Crosslinking Agent Composition 10 for Water-Compatible Resins in the form of an oil-in-water emulsion was obtained in the same way as in Example A1.

Example A11

Aside from changing PVA (molecular weight, 120,000) to polyethylene glycol (abbreviated below as "PEG"; from Nippon Nyukazai Co., Ltd.; molecular weight, 550), Crosslinking Agent Composition 11 for Water-Compatible Resins in the form of an oil-in-water emulsion was obtained in the same way as in Example A1.

Example A12

Aside from changing the hydrophobic crosslinking agent to the hydrophobic polycarbodiimide compound (P2) obtained in Synthesis Example 2, Crosslinking Agent Composition 12 for Water-Compatible Resins in the form of an oil-in-water emulsion was obtained in the same way as in Example A1.

Example A13

Aside from changing the hydrophobic crosslinking agent to the hydrophobic to polycarbodiimide compound (P3) obtained in Synthesis Example 3, Crosslinking Agent Composition 13 for Water-Compatible Resins in the form of an oil-in-water emulsion was obtained in the same way as in Example A1.

Example A14

Aside from changing the hydrophobic crosslinking agent to the hydrophobic polycarbodiimide compound (P4) obtained in Synthesis Example 4, Crosslinking Agent Composition 14 for Water-Compatible Resins in the form of an oil-in-water emulsion was obtained in the same way as in Example A1.

Example A15

Aside from changing the hydrophobic crosslinking agent to the hydrophobic polycarbodiimide compound (P5) obtained in Synthesis Example 5, Crosslinking Agent Composition 15 for Water-Compatible Resins in the form of an oil-in-water emulsion was obtained in the same way as in Example A1.

Example A16

Aside from changing the hydrophobic crosslinking agent to the hydrophobic polycarbodiimide compound (P6) obtained in Synthesis Example 6, Crosslinking Agent Composition 16 for Water-Compatible Resins in the form of an oil-in-water emulsion was obtained in the same way as in Example A1.

Example A17

Aside from changing the hydrophobic crosslinking agent to the hydrophobic polycarbodiimide compound (P7) obtained in Synthesis Example 7, Crosslinking Agent Composition 17 for Water-Compatible Resins in the form of an oil-in-water emulsion was obtained in the same way as in Example A1.

Example A18

Aside from changing the hydrophobic crosslinking agent to an isocyanurate of to hexamethylene diisocyanate (Sumidur N3300, from Sumika Covestro Urethane Co., Ltd.), Crosslinking Agent Composition 18 for Water-Compatible Resins in the form of an oil-in-water emulsion was obtained in the same way as in Example A1.

Example A19

Aside from changing the hydrophobic crosslinking agent to a melamine crosslinking agent (Nippon Carbide Industries Co., Inc.), Crosslinking Agent Composition 19 for Water-Compatible Resins in the form of an oil-in-water emulsion was obtained in the same way as in Example A1.

Example A20

Aside from preparing an oil-based solution by mixing together and stirring, at 25° C., 30 parts by weight of a silane compound crosslinking agent (Shin-Etsu Silicon Co., Ltd.) as the hydrophobic crosslinking agent and 25 parts by weight of toluene and 5 parts by weight of ethyl acetate as hydrocarbon solvents, Crosslinking Agent Composition 20 for Water-Compatible Resins in the form of an oil-in-water emulsion was obtained in the same way as in Example A1.

Example A21

Aside from changing the amounts of LAS and deionized water included to, respectively, 0.01 part by weight and 39.19 parts by weight, Crosslinking Agent Composition 21 for Water-Compatible Resins in the form of an oil-in-water emulsion was obtained in the same way as in Example A1.

Example A22

Aside from changing the amounts of LAS and deionized water included to, respectively, 0.05 part by weight and 39.15 parts by weight, Crosslinking Agent Composition 22 for Water-Compatible Resins in the form of an oil-in-water emulsion was obtained in the same way as in Example A1.

Example A23

Aside from changing the amounts of LAS and deionized water included to, to respectively, 15.0 parts by weight and 24.2 parts by weight, Crosslinking Agent Composition 23 for Water-Compatible Resins in the form of an oil-in-water emulsion was obtained in the same way as in Example A1.

Example A24

Aside from changing the amounts of LAS and deionized water included to, respectively, 10.0 parts by weight and 29.20 parts by weight, Crosslinking Agent Composition 24 for Water-Compatible Resins in the form of an oil-in-water emulsion was obtained in the same way as in Example A1.

Example A25

Aside from changing the amounts of toluene and deionized water included to, respectively, 5 parts by weight and 63.90 parts by weight, Crosslinking Agent Composition 25 for Water-Compatible Resins in the form of an oil-in-water emulsion was obtained in the same way as in Example A1.

Example A26

Aside from changing the amounts of toluene and deionized water included to, respectively, 10 parts by weight and 58.90 parts by weight, Crosslinking Agent Composition 26 for Water-Compatible Resins in the form of an oil-in-water emulsion was obtained in the same way as in Example A1.

Example A27

Aside from changing the amounts of toluene and deionized water included to, respectively, 60 parts by weight and 8.90 parts by weight, Crosslinking Agent Composition 27 for Water-Compatible Resins in the form of an oil-in-water emulsion was obtained in the same way as in Example A1.

Example A28

Aside from changing the amounts of toluene and deionized water included to, respectively, 50 parts by weight and 18.90 parts by weight, Crosslinking Agent Composition 28 for Water-Compatible Resins in the form of an oil-in-water emulsion was obtained in the same way as in Example A1.

Example A29

Aside from changing the amounts of PVA and deionized water included to, respectively, 0.01 part by weight and 39.69 parts by weight, Crosslinking Agent Composition 29 for Water-Compatible Resins in the form of an oil-in-water emulsion was obtained in the same way as in Example A1.

Example A30

Aside from changing the amounts of PVA and deionized water included to, respectively, 0.05 part by weight and 39.65 parts by weight, Crosslinking Agent Composition 30 for Water-Compatible Resins in the form of an oil-in-water emulsion was obtained in the same way as in Example A1.

Example A31

Aside from changing the amounts of PVA and deionized water included to, respectively, 15.0 parts by weight and 24.70 parts by weight, Crosslinking Agent Composition 31 for Water-Compatible Resins in the form of an oil-in-water emulsion was obtained in the same way as in Example A1.

Example A32

Aside from changing the amounts of PVA and deionized water included to, respectively, 10.0 parts by weight and 29.70 parts by weight, Crosslinking Agent Composition 32 for Water-Compatible Resins in the form of an oil-in-water emulsion was obtained in the same way as in Example A1.

Example A33

Aside from not including the surfactant LAS and changing the amount of deionized water included to 39.25 parts by weight, Crosslinking Agent Composition 33 for Water-Compatible Resins in the form of an oil-in-water emulsion was obtained in the same way as in Example A1.

Example A34

Aside from changing the hydrocarbon solvent from toluene to 2-heptanone (SP value, 8.5 $(cal/cm^{-3})^{1/2}$), Crosslinking Agent Composition 34 for Water-Compatible Resins in the form of an oil-in-water emulsion was obtained in the same way as in Example A33.

Example A35

Aside from changing the hydrocarbon solvent from toluene to methyl propyl ketone (SP value, 8.7 $(cal/cm^{-3})^{1/2}$), Crosslinking Agent Composition 35 for Water-Compatible Resins in the form of an oil-in-water emulsion was obtained in the same way as in Example A33.

Example A36

Aside from changing the hydrocarbon solvent from toluene to 2-heptanone, Crosslinking Agent Composition 36 for Water-Compatible Resins in the form of an oil-in-water emulsion was obtained was obtained in the same way as in Example A1.

Example A37

Aside from changing the hydrocarbon solvent from toluene to methyl propyl ketone, Crosslinking Agent Composition 37 for Water-Compatible Resins in the form of an oil-in-water emulsion was obtained in the same way as in Example A1.

Example A38

Aside from changing the hydrocarbon solvent from toluene to methyl butyl ketone (SP value, 8.2 $(cal/cm^{-3})^{1/2}$), Crosslinking Agent Composition 38 for Water-Compatible Resins in the form of an oil-in-water emulsion was obtained in the same way as in Example A1.

Example A39

Aside from changing the hydrocarbon solvent from toluene to methyl hexyl ketone to (SP value, 8.3 $(cal/cm^{-3})^{1/2}$), Crosslinking Agent Composition 39 for Water-Compatible Resins in the form of an oil-in-water emulsion was obtained in the same way as in Example A1.

Example A40

Aside from changing the hydrophobic crosslinking agent to the hydrophobic polycarbodiimide compound (P8) obtained in Synthesis Example 8, Crosslinking Agent Composition 40 for Water-Compatible Resins in the form of an oil-in-water emulsion was obtained in the same way as in Example A1.

Example A41

Aside from changing the hydrophobic crosslinking agent to the hydrophobic polycarbodiimide compound (P9) obtained in Synthesis Example 9, Crosslinking Agent Composition 41 for Water-Compatible Resins in the form of an oil-in-water emulsion was obtained in the same way as in Example A1.

Example A42

Aside from changing the hydrophobic crosslinking agent to aluminum isopropoxide (Tokyo Chemical Industry), Crosslinking Agent Composition 42 for Water-Compatible Resins in the form of an oil-in-water emulsion was obtained in the same way as in Example A1.

Example A43

Aside from changing the hydrophobic crosslinking agent to Epocros RPS-1005 (Nippon Shokubai Co., Ltd.), Crosslinking Agent Composition 43 for Water-Compatible Resins in the form of an oil-in-water emulsion was obtained in the same way as in Example A1.

Comparative Example A1

Aside from changing the hydrocarbon solvent toluene to the ether-type hydrophilic solvent tetrahydrofuran, Crosslinking Agent Composition 1' for Water-Compatible Resins in the form of an oil-in-water emulsion was obtained in the same way as in Example A1.

27

28

Comparative Example A2

Aside from changing the hydrophobic crosslinking agent to the hydrophilic polycarbodiimide compound (Q1) obtained in Comparative Synthesis Example 1, Crosslinking Agent Composition 2' for Water-Compatible Resins was obtained in the same way as in Example A1.

Comparative Example A3

Aside from not using the water-soluble organic compound PVA, Crosslinking Agent Composition 3' for Water-Compatible Resins was obtained in the same way as in Example A1.

The above Examples and Comparative Examples are shown collectively in Table 1.

TABLE 1

| | | Cross-linking agent com-position No. | No. | Hydrophobic compound | | | | | Water-soluble organic compound | | | IW (pbw) |
|---|---|---|---|---|---|---|---|---|---|---|---|---|
| | | | | Diisocyanate compound | End-capping compound | Amount (pbw) | Solvent | Amount (pbw) | Type | | Amount (pbw) | |
| Ex-am-ple | A1 | 1 | P1 | HMDI | CHI | 30 | toluene | 30 | PVA<br>LAS | MW = 120,000<br>anionic | 0.8<br>0.3 | 38.90 |
| | A2 | 2 | P1 | HMDI | CHI | 30 | toluene | 30 | PVA<br>LS | MW = 120,000<br>anionic | 0.8<br>0.3 | 38.90 |
| | A3 | 3 | P1 | HMDI | CHI | 30 | toluene | 30 | PVA<br>CM | MW = 120,000<br>anionic | 0.8<br>0.3 | 38.90 |
| | A4 | 4 | P1 | HMDI | CHI | 30 | Isopar M<br>toluene | 25<br>5 | PVA<br>LAS | MW = 120,000<br>anionic | 0.8<br>0.3 | 38.90 |
| | A5 | 5 | P1 | HMDI | CHI | 30 | hexane | 30 | PVA<br>LS | MW = 120,000<br>anionic | 0.8<br>0.3 | 38.90 |
| | A6 | 6 | P1 | HMDI | CHI | 30 | toluene | 30 | PVA<br>SBM | MW = 120,000<br>nonionic | 0.8<br>0.3 | 38.90 |
| | A7 | 7 | P1 | HMDI | CHI | 30 | toluene | 30 | PVA<br>BZC | MW = 120,000<br>cationic | 0.8<br>0.3 | 38.90 |
| | A8 | 8 | P1 | HMDI | CHI | 30 | toluene | 30 | PVA<br>LAS | MW = 10,000<br>anionic | 0.8<br>0.3 | 38.90 |
| | A9 | 9 | P1 | HMDI | CHI | 30 | toluene | 30 | PVA<br>LAS | MW = 1,000,000<br>anionic | 0.8<br>0.3 | 38.90 |
| | A10 | 10 | P1 | HMDI | CHI | 30 | toluene | 30 | PVP<br>LAS | MW = 250,000<br>anionic | 0.8<br>0.3 | 38.90 |
| | A11 | 11 | P1 | HMDI | CHI | 30 | toluene | 30 | PEG<br>LAS | MW = 550<br>anionic | 0.8<br>0.3 | 38.90 |
| | A12 | 12 | P2 | HMDI | CHA | 30 | toluene | 30 | PVA<br>LAS | MW = 120,000<br>anionic | 0.8<br>0.3 | 38.90 |
| | A13 | 13 | P3 | HMDI | OA | 30 | toluene | 30 | PVA<br>LAS | MW = 120,000<br>anionic | 0.8<br>0.3 | 38.90 |
| | A14 | 14 | P4 | HMDI | MPEG200 | 30 | toluene | 30 | PVA<br>LAS | MW = 120,000<br>anionic | 0.8<br>0.3 | 38.90 |
| | A15 | 15 | P5 | IPDI | CHI | 30 | toluene | 30 | PVA<br>LAS | MW = 120,000<br>anionic | 0.8<br>0.3 | 38.90 |
| | A16 | 16 | P6 | HDI | CHI | 30 | toluene | 30 | PVA<br>LAS | MW = 120,000<br>anionic | 0.8<br>0.3 | 38.90 |
| | A17 | 17 | P7 | XDI | CHI | 30 | toluene | 30 | PVA<br>LAS | MW = 120,000<br>anionic | 0.8<br>0.3 | 38.90 |
| | A18 | 18 | — | isocyanurate | — | 30 | toluene | 30 | PVA<br>LAS | MW = 120,000<br>anionic | 0.8<br>0.3 | 38.90 |
| | A19 | 19 | — | melamine | — | 30 | toluene | 30 | PVA<br>LAS | MW = 120,000<br>anionic | 0.8<br>0.3 | 38.90 |
| | A20 | 20 | — | silane compound | — | 30 | toluene<br>ethyl acetate | 25<br>5 | PVA<br>LAS | MW = 120,000<br>anionic | 0.8<br>0.3 | 38.90 |
| | A21 | 21 | P1 | HMDI | CHI | 30 | toluene | 30 | PVA<br>LAS | MW = 120,000<br>anionic | 0.8<br>0.01 | 39.19 |
| | A22 | 22 | P1 | HMDI | CHI | 30 | toluene | 30 | PVA<br>LAS | MW = 120,000<br>anionic | 0.8<br>0.05 | 39.15 |
| | A23 | 23 | P1 | HMDI | CHI | 30 | toluene | 30 | PVA<br>LAS | MW = 120,000<br>anionic | 0.8<br>15.0 | 24.20 |
| | A24 | 24 | P1 | HMDI | CHI | 30 | toluene | 30 | PVA<br>LAS | MW = 120,000<br>anionic | 0.8<br>10.0 | 29.20 |
| | A25 | 25 | P1 | HMDI | CHI | 30 | toluene | 5 | PVA<br>LAS | MW = 120,000<br>anionic | 0.8<br>0.3 | 63.90 |
| | A26 | 26 | P1 | HMDI | CHI | 30 | toluene | 10 | PVA<br>LAS | MW = 120,000<br>anionic | 0.8<br>0.3 | 58.90 |
| | A27 | 27 | P1 | HMDI | CHI | 30 | toluene | 60 | PVA<br>LAS | MW = 120,000<br>anionic | 0.8<br>0.3 | 8.90 |
| | A28 | 28 | P1 | HMDI | CHI | 30 | toluene | 50 | PVA<br>LAS | MW = 120,000<br>anionic | 0.8<br>0.3 | 18.90 |
| | A29 | 29 | P1 | HMDI | CHI | 30 | toluene | 30 | PVA<br>LAS | MW = 120,000<br>anionic | 0.01<br>0.3 | 39.69 |
| | A30 | 30 | P1 | HMDI | CHI | 30 | toluene | 30 | PVA<br>LAS | MW = 120,000<br>anionic | 0.05<br>0.3 | 39.65 |

TABLE 1-continued

| | | | | | | | | | | | |
|---|---|---|---|---|---|---|---|---|---|---|---|
| A31 | 31 | P1 | HMDI | CHI | 30 | toluene | 30 | PVA LAS | MW = 120,000 anionic | 15.0 0.3 | 24.70 |
| A32 | 32 | P1 | HMDI | CHI | 30 | toluene | 30 | PVA LAS | MW = 120,000 anionic | 10.0 0.3 | 29.70 |
| A33 | 33 | P1 | HMDI | CHI | 30 | toluene | 30 | PVA LAS | MW = 120,000 anionic | 0.8 0.0 | 39.20 |
| A34 | 34 | P1 | HMDI | CHI | 30 | 2-heptanone | 30 | PVA LAS | MW = 120,000 anionic | 0.8 0.0 | 39.20 |
| A35 | 35 | P1 | HMDI | CHI | 30 | methyl propyl ketone | 30 | PVA LAS | MW = 120,000 anionic | 0.8 0.0 | 39.20 |
| A36 | 36 | P1 | HMDI | CHI | 30 | 2-heptanone | 30 | PVA LAS | MW = 120,000 anionic | 0.8 0.3 | 38.90 |
| A37 | 37 | P1 | HMDI | CHI | 30 | methyl propyl ketone | 30 | PVA LAS | MW = 120,000 anionic | 0.8 0.3 | 38.90 |
| A38 | 38 | P1 | HMDI | CHI | 30 | methyl butyl ketone | 30 | PVA LAS | MW = 120,000 anionic | 0.8 0.3 | 38.90 |
| A39 | 39 | P1 | HMDI | CHI | 30 | methyl hexyl ketone | 30 | PVA LAS | MW = 120,000 anionic | 0.8 0.3 | 38.90 |
| A40 | 40 | P8 | TMXDI | OA | 30 | toluene | 30 | PVA LAS | MW = 120,000 anionic | 0.8 0.3 | 38.90 |
| A41 | 41 | P9 | MDI | OA | 30 | toluene | 30 | PVA LAS | MW = 120,000 anionic | 0.8 0.3 | 38.90 |
| A42 | 42 | — | aluminum isopropoxide | — | 30 | toluene | 30 | PVA LAS | MW = 120,000 anionic | 0.8 0.3 | 38.90 |
| A43 | 43 | — | oxazoline | — | 30 | toluene | 30 | PVA LAS | MW = 120,000 anionic | 0.8 0.3 | 38.90 |
| Comparative Example | A1 1' | P1 | HMDI | CHI | 30 | THF | 30 | PVA LAS | MW = 120,000 anionic | 0.8 0.3 | 38.90 |
| | A2 2' | Q1 | HMDI | MPEG550 | 30 | toluene | 30 | PVA LAS | MW = 120,000 anionic | 0.8 0.3 | 38.90 |
| | A3 3' | P1 | HMDI | CHI | 30 | toluene | 30 | PVA LAS | MW = 120,000 anionic | — 0.3 | 39.70 |

[3] Preparation of Water-Compatible Resin Compositions
(a) Preparation of Water-Compatible Urethane Resin Compositions

Examples B1 to B43, Comparative Examples B1 to B3

Water-compatible urethane resin compositions were prepared by mixing in each case 6.67 parts by weight (2 parts by weight as the crosslinking agent) of the respective Crosslinking Agent Compositions 1 to 43 and 1' to 3' for Water-Compatible Resins obtained in Examples A1 to A43 and Comparative Examples A1 to A3 with 285.7 parts by weight (solids content, 100 parts by weight) of a carboxyl group-containing water-compatible polyurethane resin (Suncure 777, from Lubrizol; solids content, 35 wt %).

Example B44

A water-compatible urethane resin composition was prepared by mixing 3.335 parts by weight (1 part by weight as the crosslinking agent) of Crosslinking Agent Composition 1 for Water-Compatible Resin obtained in Example A1 with 285.7 parts by weight (solids content, 100 parts by weight) of a carboxyl group-containing water-compatible polyurethane resin (Suncure 777, from Lubrizol; solids content, 35 wt %).

A storage stability test, a water resistance test, a solvent resistance test and a wet-on-wet coating evaluation test were carried out by the methods described below on each of the water-compatible urethane resin compositions or cured films obtained in Examples B1 to B44 and Comparative Examples B1 to B3. The results are shown in Table 2.

(1) Storage Stability Test

The water-compatible resin composition was held at 40° C. and a storage stability test was carried out. The viscosities immediately after preparation and when 30 days had passed were measured, the percent change in viscosity after 30 days relative to the viscosity immediately following preparation was determined, and this was used to evaluate the storage stability. A percent change in viscosity of 0% means that there is no change in viscosity; the closer the percent change in viscosity is to 0%, the better the storage stability.

Viscosity measurements were carried out at a temperature of 20° C. and a rotational speed of 60 rpm using a Brookfield viscometer (TVB-10M; rotor, TM2; from Toki Sangyo Co., Ltd.).

The percent change in viscosity was evaluated according to the criteria AAA to E shown below. Water-compatible resin compositions receiving an evaluation of AAA, AA, A, B or C can be regarded as having sufficient storage stability.

Evaluation Criteria

AAA: Percent change in viscosity is less than 3%
AA: Percent change in viscosity is at least 3% but less than 5%
A: Percent change in viscosity is at least 5% but less than 10%
B: Percent change in viscosity is at least 10% but less than 20%
C: Percent change in viscosity is at least 20% but less than 30%
D: Percent change in viscosity is at least 30% but less than 50%
E: Percent change in viscosity is at least 50%
(2) Water Resistance Test Film samples were created by coating a water-compatible resin composition onto an aluminum plate using a bar coater (32-gauge wire rod), drying at 80° C. for 10 minutes and then leaving the dried film to stand for one day at room temperature (25° C.).

Absorbent cotton soaked in deionized water was placed on top of each film sample and left to stand for 24 hours, following which the condition of the film sample was visually examined and scored on a four-point scale based on the criteria shown below. The average score for ten samples was determined. A higher score indicates that the film formed from the water-compatible resin composition has a better water resistance.

4 points: No change 3 points: Contour mark present overall 2 points: Clarity is somewhat diminished 1 point: Opaque overall or with foaming in places 0 points: Foaming overall or cracks in film The average score obtained was evaluated based on the following criteria. Films receiving an evaluation of AA, A, B or C can be regarded as having sufficient water resistance.

The average score obtained was evaluated based on the following criteria. Films receiving an evaluation of AA, A, B or C can be regarded as having sufficient water resistance.

AA: 5 points—no damage

A: 4 points

B: At least 3 points but less than 4 points

C: At least 2 points but less than 3 points

D: At least 1 point but less than 2 points

E: Less than 1 point (3) Solvent Resistance Test

Film samples were created by coating a water-compatible resin composition onto an aluminum plate using a bar coater (32-gauge wire rod), and drying at 80° C. for 10 minutes.

The solvent resistance test was carried out on each film sample by using an abrasion tester (FR-1B from Suga Test Instruments Co., Ltd.) to rub the sample 50 times back-and-forth (double rubbing) with absorbent cotton soaked in a 70 wt % aqueous solution of ethanol as the solvent (load, 900 g/cm²).

The condition of the film sample after the test was visually examined and the degree of whitening, the remaining surface area of the film and the gray scale (coloration of the absorbent cotton after double rubbing) were scored based on the criteria shown below. With 5 points serving as the highest score for each, the average score for two types of evaluation was determined and this average score was then averaged for two tests to give an overall evaluation. A higher overall evaluation indicates that the film formed from the water-compatible resin composition has a better organic solvent resistance.

[Degree of Whitening]

5 points: No change 4 points: Faint rubbing marks or slight whitening 3 points: Whitening of some areas 2 points: Overall whitening 1 point: Dissolution of some areas 0 points: Complete dissolution

[Remaining Surface Area of Film]

5 points: 100%

4.5 points: At least 95% but less than 100%

4 points: At least 85% but less than 95%

3.5 points: At least 75% but less than 85%

3 points: At least 60% but less than 75%

2.5 points: At least 45% but less than 60%

2 points: At least 40% but less than 45%

1.5 points: At least 25% but less than 40%

1 point: At least 10% but less than 25%

0 points: Less than 10%

[Overall Evaluation]

An overall evaluation was carried out according to the following criteria. Films receiving an evaluation of AA, A, B or C can be regarded as having sufficient solvent resistance.

AA: 5 points—no damage

A: 4 points

B: At least 3 points but less than 4 points

C: At least 2 points but less than 3 points

D: At least 1 point but less than 2 points

E: Less than 1 point (4) Wet-On-Wet Coating Evaluation

A water-compatible resin composition was applied onto an aluminum plate using an air spray gun under conditions that give a dry film thickness of 30 μm, and 10 minutes of setting was carried out. The same water-compatible resin composition was then coated on top of this with an air spray gun (dry film thickness, 15 μm; total thickness, 45 μm), and preheating was carried out at 80° C. for 3 minutes. Next, top coating (dry film thickness, 30 μm) was carried out with a two-part curable polyurethane clear coating (available under the trade name Body Paint Urethane Clear from SOFT99 corporation) and the applied coating was baked at 80° C., giving a multilayer film.

Upon visual examination of the appearance of the resulting multilayer film, abnormalities in the film appearance were not observed in any of the cases in which a water-compatible resin composition was used.

A water resistance test and a solvent resistance test were carried out in the same way as in (2) and (3) above on the resulting multilayer film.

In addition, an evaluation of the adhesion (interlaminar adhesion) between both layers—that is, the film obtained from the water-compatible resin composition and the film obtained from the polyurethane clear coating—making up the resulting multilayer film was carried out by a crosscut test in accordance with ASTM D3359-B.

The test conditions involved creating, in a 25° C. environment, a 6×6 crosscut pattern at 2 mm intervals with a cutter, attaching tape having a tack strength of 6.7 N/cm, and evaluating the adhesion according to the criteria shown below based on the amount (surface area) of film that remains when the tape is peeled off. When the resulting evaluation is from AA to C, the interlaminar adhesion can be regarded as good.

AA: No delamination

A: Less than 5% delamination

B: At least 5% but less than 15% delamination

C: At least 15% but less than 35% delamination

D: At least 35% but less than 65% delamination

E: More than 65% delamination

TABLE 2

| | | | Crosslinking agent composition | | | Film evaluations | | Wet-on-wet coating evaluations | | |
| | | | Amount included (pbw) | | | | | | | |
| | | | Crosslinking | | | | | | | |
| | | No. | agent ingredient | Composition | Storage stability | Water resistance | Solvent resistance | Water resistance | Solvent resistance | Interlaminar adhesion |
|---|---|---|---|---|---|---|---|---|---|---|
| Example | B1 | 1 | 2 | 6.67 | AAA | AA | AA | AA | AA | AA |
| | B2 | 2 | 2 | 6.67 | AAA | AA | AA | AA | AA | AA |
| | B3 | 3 | 2 | 6.67 | AAA | AA | AA | AA | AA | AA |
| | B4 | 4 | 2 | 6.67 | A | AA | AA | AA | AA | AA |
| | B5 | 5 | 2 | 6.67 | AA | AA | AA | AA | AA | AA |
| | B6 | 6 | 2 | 6.67 | A | AA | AA | AA | AA | AA |
| | B7 | 7 | 2 | 6.67 | B | AA | AA | AA | AA | AA |
| | B8 | 8 | 2 | 6.67 | B | AA | AA | AA | AA | AA |
| | B9 | 9 | 2 | 6.67 | B | AA | AA | AA | AA | AA |
| | B10 | 10 | 2 | 6.67 | B | AA | AA | AA | AA | AA |
| | B11 | 11 | 2 | 6.67 | B | AA | AA | AA | AA | AA |
| | B12 | 12 | 2 | 6.67 | AAA | AA | AA | AA | AA | AA |
| | B13 | 13 | 2 | 6.67 | AAA | AA | AA | AA | AA | AA |
| | B14 | 14 | 2 | 6.67 | AAA | AA | AA | AA | AA | AA |
| | B15 | 15 | 2 | 6.67 | AAA | AA | AA | AA | AA | AA |
| | B16 | 16 | 2 | 6.67 | AA | AA | AA | AA | AA | AA |
| | B17 | 17 | 2 | 6.67 | AA | AA | AA | AA | AA | AA |
| | B18 | 18 | 2 | 6.67 | A | AA | AA | AA | AA | AA |
| | B19 | 19 | 2 | 6.67 | A | AA | AA | AA | AA | AA |
| | B20 | 20 | 2 | 6.67 | A | AA | AA | AA | AA | AA |
| | B21 | 21 | 2 | 6.67 | A | AA | AA | AA | AA | AA |
| | B22 | 22 | 2 | 6.67 | A | AA | AA | AA | AA | AA |
| | B23 | 23 | 2 | 6.67 | B | B | B | B | B | B |
| | B24 | 24 | 2 | 6.67 | A | A | A | A | A | A |
| | B25 | 25 | 2 | 6.67 | B | B | B | B | B | B |
| | B26 | 26 | 2 | 6.67 | A | A | A | A | A | A |
| | B27 | 27 | 2 | 6.67 | B | B | B | B | B | B |
| | B28 | 28 | 2 | 6.67 | A | A | A | A | A | A |
| | B29 | 29 | 2 | 6.67 | B | B | B | B | B | B |
| | B30 | 30 | 2 | 6.67 | A | A | A | A | A | A |
| | B31 | 31 | 2 | 6.67 | B | B | B | B | B | B |
| | B32 | 32 | 2 | 6.67 | A | A | A | A | A | A |
| | B33 | 33 | 2 | 6.67 | A | AA | AA | AA | AA | AA |
| | B34 | 34 | 2 | 6.67 | A | AA | AA | AA | AA | AA |
| | B35 | 35 | 2 | 6.67 | A | AA | AA | AA | AA | AA |
| | B36 | 36 | 2 | 6.67 | AAA | AA | AA | AA | AA | AA |
| | B37 | 37 | 2 | 6.67 | AAA | AA | AA | AA | AA | AA |
| | B38 | 38 | 2 | 6.67 | AAA | AA | AA | AA | AA | AA |
| | B39 | 39 | 2 | 6.67 | AAA | AA | AA | AA | AA | AA |
| | B40 | 40 | 2 | 6.67 | AAA | AA | A | AA | A | AA |
| | B41 | 41 | 2 | 6.67 | A | AA | AA | AA | AA | AA |
| | B42 | 42 | 2 | 6.67 | A | AA | AA | AA | AA | AA |
| | B43 | 43 | 2 | 6.67 | A | AA | AA | AA | AA | AA |
| | B44 | 1 | 1 | 3.335 | AA | AA | AA | AA | AA | AA |
| | | 40 | 1 | 3.335 | | | | | | |
| Comparative Example | B1 | 1' | 2 | 6.67 | E | C | C | C | C | C |
| | B2 | 2' | 2 | 6.67 | D | C | C | C | C | C |
| | B3 | 3' | 2 | 6.67 | D | C | C | C | C | C |

(b) Preparation of Water-Compatible Acrylic Resin Compositions

Examples C1 to C3, Comparative Examples C1 to C3

Water-compatible acrylic resin compositions were prepared by mixing 6.67 parts by weight (2 parts by weight as the crosslinking agent) of the respective Crosslinking Agent Compositions 1, 15 and 33 and 1' to 3' for Water-Compatible Resins obtained in Examples A1, A15 and A33 and Comparative Examples A1 to A3 with 250 parts by weight (solids content, 100 parts by weight) of a carboxyl group-containing water-compatible acrylic resin (VF-1060, from DIC Corporation; solids content, 40 wt %).

A storage stability test, a water resistance test, a solvent resistance test and a wet-on-wet coating evaluation test were carried out, in the same way as for the above water-compatible urethane resin compositions, on the respective water-compatible acrylic resin compositions or cured films obtained in Examples C1 to C3 and Comparative Examples C1 to C3. The results are shown in Table 3.

TABLE 3

| | | | | | | Film evaluations | | Wet-on-wet coating evaluations | | |
|---|---|---|---|---|---|---|---|---|---|---|
| | | | Crosslinking agent composition | | | | | | | |
| | | | Amount included (pbw) | | | | | | | |
| | | | Crosslinking | | | | | | | |
| | | No. | agent ingredient | Composition | Storage stability | Water resistance | Solvent resistance | Water resistance | Solvent resistance | Interlaminar adhesion |
| Example | C1 | 1 | 2 | 6.67 | AA | AA | AA | AA | AA | AA |
| | C2 | 15 | 2 | 6.67 | AA | AA | AA | AA | AA | AA |
| | C3 | 33 | 2 | 6.67 | AA | AA | AA | AA | AA | AA |
| Comparative | C1 | 1' | 2 | 6.67 | E | C | C | C | C | C |
| Example | C2 | 2' | 2 | 6.67 | D | C | C | C | C | C |
| | C3 | 3' | 2 | 6.67 | D | C | C | C | C | C |

(c) Preparation of Water-Compatible Polyester Resin Compositions

Examples D1 to D3, Comparative Examples D1 to D3

Water-compatible polyester resin compositions were prepared by mixing 6.67 parts by weight (2 parts by weight as the crosslinking agent) of the respective Crosslinking Agent Compositions 1, 15 and 33 and 1' to 3' for Water-Compatible Resins obtained in Examples A1, A15 and A33 and Comparative Examples A1 to A3 with 400 parts by weight (solids content, 100 parts by weight) of a carboxyl group-containing water-compatible polyester resin (Plas Coat Z-730, from Goo Chemical Co., Ltd.; solids content, 25 wt %).

A storage stability test, a water resistance test, a solvent resistance test and a wet-on-wet coating evaluation test were carried out, in the same way as for the above water-compatible urethane resin compositions, on the respective water-compatible polyester resin compositions or cured films obtained in Examples D1 to D3 and Comparative Examples D1 to D3. The results are shown in Table 4.

TABLE 4

| | | | | | | Film evaluations | | Wet-on-wet coating evaluations | | |
|---|---|---|---|---|---|---|---|---|---|---|
| | | | Crosslinking agent composition | | | | | | | |
| | | | Amount included (pbw) | | | | | | | |
| | | | Crosslinking | | | | | | | |
| | | No. | agent ingredient | Composition | Storage stability | Water resistance | Solvent resistance | Water resistance | Solvent resistance | Interlaminar adhesion |
| Example | D1 | 1 | 2 | 6.67 | AA | AA | AA | AA | AA | AA |
| | D2 | 15 | 2 | 6.67 | AA | AA | AA | AA | AA | AA |
| | D3 | 33 | 2 | 6.67 | AA | AA | AA | AA | AA | AA |
| Comparative | D1 | 1' | 2 | 6.67 | E | C | C | C | C | C |
| Example | D2 | 2' | 2 | 6.67 | D | C | C | C | C | C |
| | D3 | 3' | 2 | 6.67 | D | C | C | C | C | C |

(d) Preparation of Water-Compatible Epoxy Resin Compositions

Examples E1 to E3, Comparative Examples E1 to E3

Water-compatible epoxy resin compositions were prepared by mixing 6.67 parts by weight (2 parts by weight as the crosslinking agent) of the respective Crosslinking Agent Compositions 1, 15 and 33 and 1' to 3' for Water-Compatible Resins obtained in Examples A1, A15 and A33 and Comparative Examples Al to A3 with 1,333.3 parts by weight (solids content, 100 parts by weight) of a water-compatible epoxy resin (EM-85-75W, from DIC Corporation, in a carboxylic acid-modified form; solids content, 75 wt %).

A storage stability test, a water resistance test, a solvent resistance test and a wet on-wet coating evaluation test were carried out, in the same way as for the above water-compatible urethane resin compositions, on the respective water-compatible epoxy resin compositions or cured films obtained in Examples E1 to E3 and Comparative Examples E1 to E3. The results are shown in Table 5.

TABLE 5

| | | | Crosslinking agent composition Amount included (pbw) Crosslinking | | | Film evaluations | | Wet-on-wet coating evaluations | | |
| | | No. | agent ingredient | Composition | Storage stability | Water resistance | Solvent resistance | Water resistance | Solvent resistance | Interlaminar adhesion |
|---|---|---|---|---|---|---|---|---|---|---|
| Example | E1 | 1 | 2 | 6.67 | AA | AA | AA | AA | AA | AA |
| | E2 | 15 | 2 | 6.67 | AA | AA | AA | AA | AA | AA |
| | E3 | 33 | 2 | 6.67 | AA | AA | AA | AA | AA | AA |
| Comparative | E1 | 1' | 2 | 6.67 | E | C | C | C | C | C |
| Example | E2 | 2' | 2 | 6.67 | D | C | C | C | C | C |
| | E3 | 3' | 2 | 6.67 | D | C | C | C | C | C |

As shown in Tables 2 to 5, it is apparent that the water-compatible resin compositions prepared in the Examples have a good storage stability and moreover that, in wet-on-wet coating, good multilayer films can be formed.

In addition, it is apparent that cured products (films) of the water-compatible resin compositions prepared in the Examples also have an excellent water resistance and solvent resistance.

The invention claimed is:

1. A crosslinking agent composition for water-compatible resins, comprising a hydrophobic crosslinking agent, a water-soluble organic compound, one or more oily medium selected from the group consisting of ketone solvents having a solubility parameter of 9.0 $(cal/cm^3)^{1/2}$ or less and hydrocarbon solvents, and an aqueous medium, wherein the oily medium is included in an amount of from 15 to 200 parts by weight per 100 parts by weight of the hydrophobic crosslinking agent, wherein the water-soluble organic compound is one or more water-soluble polymer selected from the group consisting of polyvinylpyrrolidone, polyvinyl alcohol, polyethyleneimine, polyacrylic acid, polyacrylamide, carboxymethyl cellulose, starch and gelatin, and wherein an amount of the water-soluble organic compound is 0.03 to 50 parts by weight per 100 parts by weight of the hydrophobic crosslinking agent.

2. The crosslinking agent composition for water-compatible resins of claim 1, wherein the composition is in the form of an emulsion in which an oily phase containing the hydrophobic crosslinking agent and the oily medium is dispersed in the aqueous medium.

3. The crosslinking agent composition for water-compatible resins of claim 1, wherein the hydrophobic crosslinking agent includes one or more selected from the group consisting of carbodiimide compounds, isocyanate compounds, polyfunctional epoxy compounds, silane compounds, metallic compounds, oxazoline compounds and melamines.

4. The crosslinking agent composition for water-compatible resins of claim 3, wherein the hydrophobic crosslinking agent includes a carbodiimide compound.

5. The crosslinking agent composition for water-compatible resins of claim 1, wherein the hydrocarbon solvent is an isoparaffinic solvent or an aromatic hydrocarbon solvent.

6. The crosslinking agent composition for water-compatible resins of claim 1, wherein the ketone solvent is methyl isopropyl ketone, methyl butyl ketone, methyl propyl ketone, methyl hexyl ketone, 2-heptanone, 3-heptanone or 4-heptanone.

7. The crosslinking agent composition for water-compatible resins of claim 1, wherein the water-soluble organic compound is one or more selected from the group consisting of alkylene glycol compounds and water-soluble polymers other than alkylene glycol compounds.

8. The crosslinking agent composition for water-compatible resins of claim 1, wherein the composition includes from 10 to 250 parts by weight of the oily medium per 100 parts by weight of the hydrophobic crosslinking agent.

9. The crosslinking agent composition for water-compatible resins of claim 1, wherein the aqueous medium includes at least 50 wt % of water.

10. The crosslinking agent composition for water-compatible resins of claim 1, further comprising a surfactant.

11. The crosslinking agent composition for water-compatible resins of claim 10, wherein the surfactant is an anionic surfactant.

12. The crosslinking agent composition for water-compatible resins of claim 10, wherein the surfactant is selected from the group consisting of alkylbenzene sulfonates, alkyl sulfates and sodium N-cocoyl methyl taurate.

13. The crosslinking agent composition for water-compatible resins of claim 6, wherein the ketone solvent is methyl hexyl ketone, 2-heptanone, 3-heptanone or 4-heptanone.

* * * * *